US010705645B2

(12) United States Patent
Tushar Balasaheb

(10) Patent No.: US 10,705,645 B2
(45) Date of Patent: Jul. 7, 2020

(54) METHOD FOR PROTECTING PERSONAL INFORMATION AND ELECTRONIC DEVICE THEREOF

(71) Applicant: Samsung Electronics Co., Ltd., Suwon-si, Gyeonggi-do (KR)

(72) Inventor: Sandhan Tushar Balasaheb, Yeongtong-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 15/695,530

(22) Filed: Sep. 5, 2017

(65) Prior Publication Data

US 2018/0074643 A1 Mar. 15, 2018

(30) Foreign Application Priority Data

Sep. 12, 2016 (KR) ........................ 10-2016-0117150

(51) Int. Cl.

| | |
|---|---|
| ***G06F 3/041*** | (2006.01) |
| ***G06F 3/0484*** | (2013.01) |
| ***G06K 9/00*** | (2006.01) |
| ***G06F 3/0488*** | (2013.01) |
| ***G06F 21/31*** | (2013.01) |
| ***G06F 21/32*** | (2013.01) |

(52) U.S. Cl.

CPC .......... *G06F 3/0416* (2013.01); *G06F 3/0412* (2013.01); *G06F 3/0414* (2013.01);

(Continued)

(58) Field of Classification Search

CPC .... G06F 3/0416; G06F 3/0484; G06F 3/0412; G06F 21/32; G06F 3/0488; G06F 21/316; G06F 3/0414; G06F 2203/04105; G06K 9/00597; G06K 9/00087; G06K 9/0004; G06K 9/0002; G06K 9/00281

See application file for complete search history.

(56) References Cited

U.S. PATENT DOCUMENTS

| | | | | |
|---|---|---|---|---|
| 2009/0034804 A1* | 2/2009 | Cho | ........................ | G06F 21/608 382/116 |
| 2011/0284025 A1* | 11/2011 | Lemchen | ................ | B08B 1/008 134/6 |

(Continued)

FOREIGN PATENT DOCUMENTS

| | | |
|---|---|---|
| KR | 20060003689 A | 1/2006 |
| KR | 20110103598 A | 9/2011 |
| WO | 2015053573 A1 | 4/2015 |

OTHER PUBLICATIONS

AlRowaily et al, Oily Residuals Security threat on Smart phones, 2011, IEEE, 3 Pages (Year: 2011).*

(Continued)

*Primary Examiner* — Christopher C Harris

(74) *Attorney, Agent, or Firm* — Jefferson IP Law, LLP

(57) ABSTRACT

An electronic device for preemptively removing biometric information from a display is provided. The electronic device includes a display, at least one sensor disposed under a region of the display and at least one processor. The at least one processor may be configured to detect, using the at least one sensor, a touch input on the region of the display and display, using the display, a user interface which guides to remove a mark caused by the touch input, wherein the mark includes biometric information acquired based on the touch input.

20 Claims, 25 Drawing Sheets

(52) U.S. Cl.
CPC .......... *G06F 3/0484* (2013.01); *G06F 3/0488* (2013.01); *G06F 21/316* (2013.01); *G06F 21/32* (2013.01); *G06K 9/0002* (2013.01); *G06K 9/0004* (2013.01); *G06K 9/00046* (2013.01); *G06K 9/00087* (2013.01); *G06K 9/00281* (2013.01); *G06K 9/00597* (2013.01); *G06K 9/00912* (2013.01); *G06F 2203/04105* (2013.01)

(56) References Cited

U.S. PATENT DOCUMENTS

| | | | | |
|---|---|---|---|---|
| 2012/0212322 | A1* | 8/2012 | Idsoe | G06F 21/32 340/5.53 |
| 2013/0169572 | A1 | 7/2013 | Zhou et al. | |
| 2015/0358317 | A1 | 12/2015 | Deutschmann et al. | |
| 2016/0063230 | A1 | 3/2016 | Alten | |
| 2016/0140379 | A1* | 5/2016 | Pedersen | G06K 9/00919 726/19 |
| 2016/0171281 | A1* | 6/2016 | Park | G06F 1/1643 382/124 |
| 2017/0213048 | A1* | 7/2017 | Kaladgi | G06F 21/6245 |

OTHER PUBLICATIONS

Lee et al, Here Is Your Fingerprint! Actual Risk versus User Perception of Latent Fingerprints and Smudges Remaining on Smartphones, 2017, 16 Pages (Year: 2017).*

Zhang et al, Fingerprint Attack against Touch-enabled Devices, Oct. 2012, SPSM, 12 Pages (Year: 2012).*

Extended European Search Report dated Jun. 17, 2019, issued in European Application No. 17849096.7.

* cited by examiner

METHOD FOR PROTECTING PERSONAL INFORMATION AND ELECTRONIC DEVICE THEREOF

CROSS-REFERENCE TO RELATED APPLICATION(S)

This application claims the benefit under 35 U.S.C. § 119(a) of a Korean patent application filed on Sep. 12, 2016 in the Korean Intellectual Property Office and assigned Serial number 10-2016-0117150, the entire disclosure of which is hereby incorporated by reference.

TECHNICAL FIELD

The present disclosure relates to a method and an electronic device for protecting personal information. More particularly, the present disclosure relates to a method and an electronic device for preventing biometric information from being stolen in the electronic device.

BACKGROUND

For allowing an access only to a specific user during operation of the electronic device, personal information of the specific user may be required. The electronic device may perform user authentication by using biometric information among personal information of the specific user when the electronic device is unlocked or when the user authentication is required in a specific application in the electronic device. The method for acquiring biometric information may include iris recognition, fingerprint recognition, face recognition, palm print recognition, vein distribution recognition, and the like. A sensor for fingerprint recognition is widely used because it is possible to implement a fingerprint recognition sensor with high security, with low cost or in a small size.

For fingerprint recognition, the electronic device may acquire fingerprint information through a sensor embedded in the electronic device or through a module outside the electronic device, and prevent fingerprint information leakage by establishing security for the acquired fingerprint information. However, physical fingerprint mark generated during the fingerprint recognition process may remain on the surface or outside of the electronic device. The fingerprint mark may be stolen easily.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for removing residual biometric information from a screen for security of the biometric information.

In accordance with an aspect of the present disclosure, an electronic device is provided. The electronic device includes a memory, a display, at least one sensor disposed under at least in part region of the display and at least one processor. The at least one processor may be configured to execute instructions stored in the memory to detect, through the at least one sensor, a touch input on the at least in part region of the display and display, through the display, a user interface which guides to remove a mark caused by the touch input, wherein the mark includes at least a portion of biometric information acquired based on the touch input.

In accordance with another aspect of the present disclosure, a method of an electronic device is provided. The method includes detecting, through at least one sensor disposed under at least in part region of a display of the electronic device, a touch input on the at least in part region of the display and displaying, through the display, a user interface which guides to remove a mark caused by the touch input, wherein the mark includes at least a portion of biometric information acquired based on the touch input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
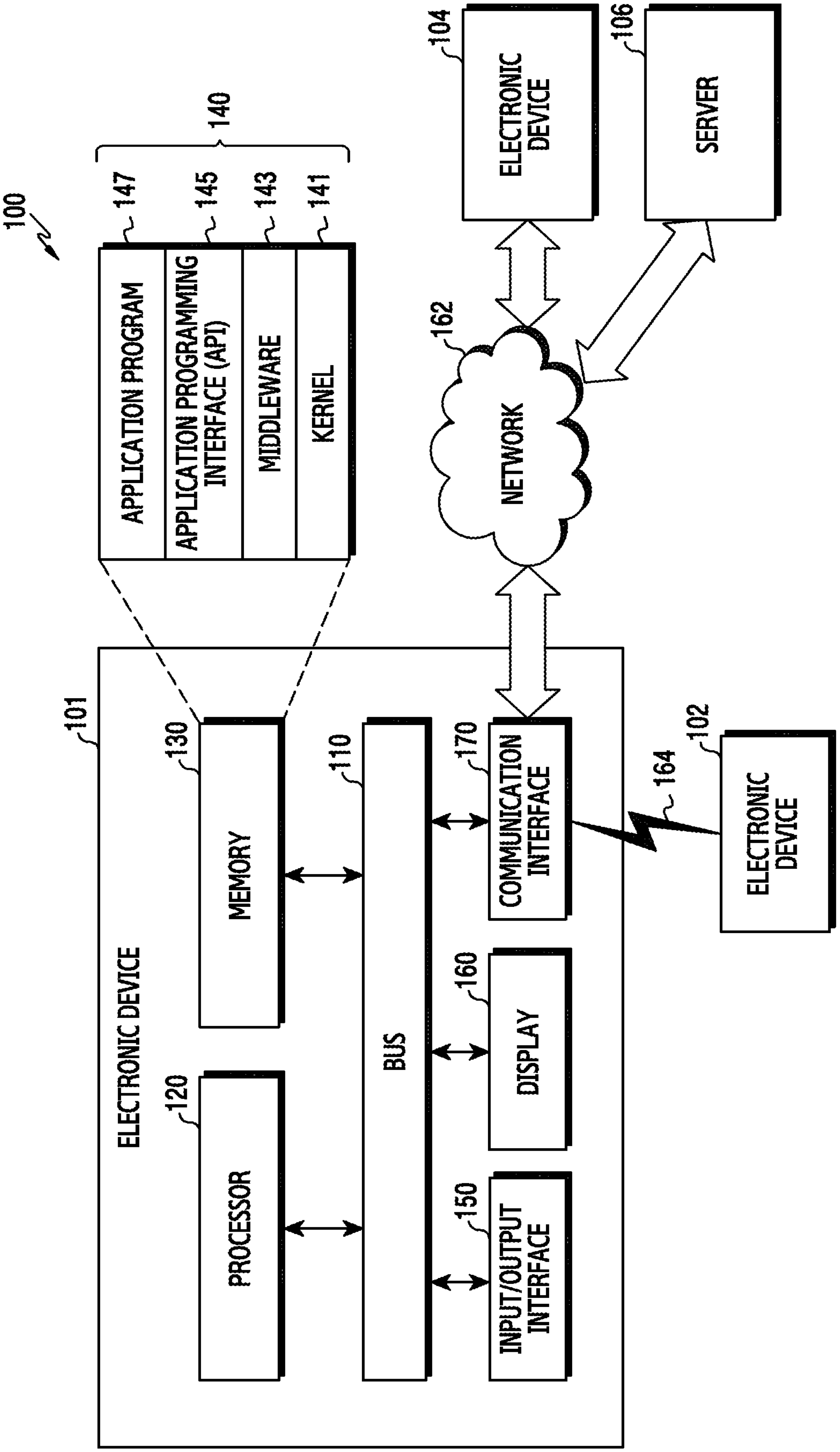
FIG. 1 illustrates a block diagram of a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

In the present document, a fingerprint refers to a pattern formed on the surface of finger of a human body. It should be noted that although fingerprint is described as an example of user authentication in the present document, patterns are not excluded as an example of means for performing user authentication.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), a Motion Picture Experts Group (MPEG-1 or MPEG-2) Audio Layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an Internet of things (IoT) device (e.g., an electric bulb, various sensors, a sprinkler device, a fire alarm, a thermostat, a streetlight, a toaster, an exerciser, a hot water tank, a heater, a boiler, etc.) or a public device (e.g., kiosk) located in public place. According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a block diagram of a network environment according to an embodiment of the present disclosure.

Referring to FIG. 1, an electronic device 101 within a network environment 100 in various embodiments is described. The electronic device 101 may include a bus 110, a processor 120, a memory 130, an input/output interface 150, a display 160, and a communication interface 170. In some embodiment, the electronic device 101 may omit at least one of the constituent elements or additionally have another constituent element. The bus 110 may, for example, include a circuit coupling the constituent elements 110, 120, 150, 160 and 170 with one another and forwarding communication (e.g., a control message or data) between the constituent elements. The processor 120 may include one or more of a CPU, an AP or a communication processor (CP). The processor 120 may, for example, execute operation or data processing for control and/or communication of at least one another constituent element of the electronic device 101. Also, the processor 120 may recognize (or identify) the fingerprint through the input/output interface 150 or the communication interface 170 and may control operation for detecting a fingerprint mark.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like The input/output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body. Also, the display 160 may include a fingerprint sensor capable of detecting a user's fingerprint through a touch screen. The communication interface 170 may, for example, establish communication between the electronic device 101 and an external device (e.g., the first external electronic device 102, the second external electronic device 104, or the server 106). For example, the communication interface 170 may be coupled to a network 162 through wireless communication or wired communication, to communicate with the external device (e.g., the second external electronic device 104 or the server 106). Also, the communication interface 170 may transmit and receive a signal including fingerprint information through wireless communication or wired communication with another external device and may acquire position information of the electronic device 101. The communication interface 170 may communicate with the external device (e.g., the first external electronic device 102) using a short-range communication link 164.

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like. The network 162 may include at least one of a telecommunications network, for example, a computer network (e.g., local area network (LAN) or wide area network (WAN)), the Internet or a telephone network.

Each of the first and second external electronic devices 102 and 104 may be a device of the same or different type from that of the electronic device 101. According to various embodiments, all or some of operations executed in the electronic device 101 may be executed in another one electronic device or a plurality of electronic devices (e.g., the first and second external electronic devices 102 and 104 or the server 106). According to an embodiment, in case where the electronic device 101 performs some function or service automatically or in response to a request, the electronic device 101 may, instead of or additionally to executing the function or service in itself, send a request for execution of at least a partial function associated with this to another device (e.g., the first and second external electronic device 102, 104 or server 106). The other electronic device (e.g., the first and second external electronic device 102 and 104 or the server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
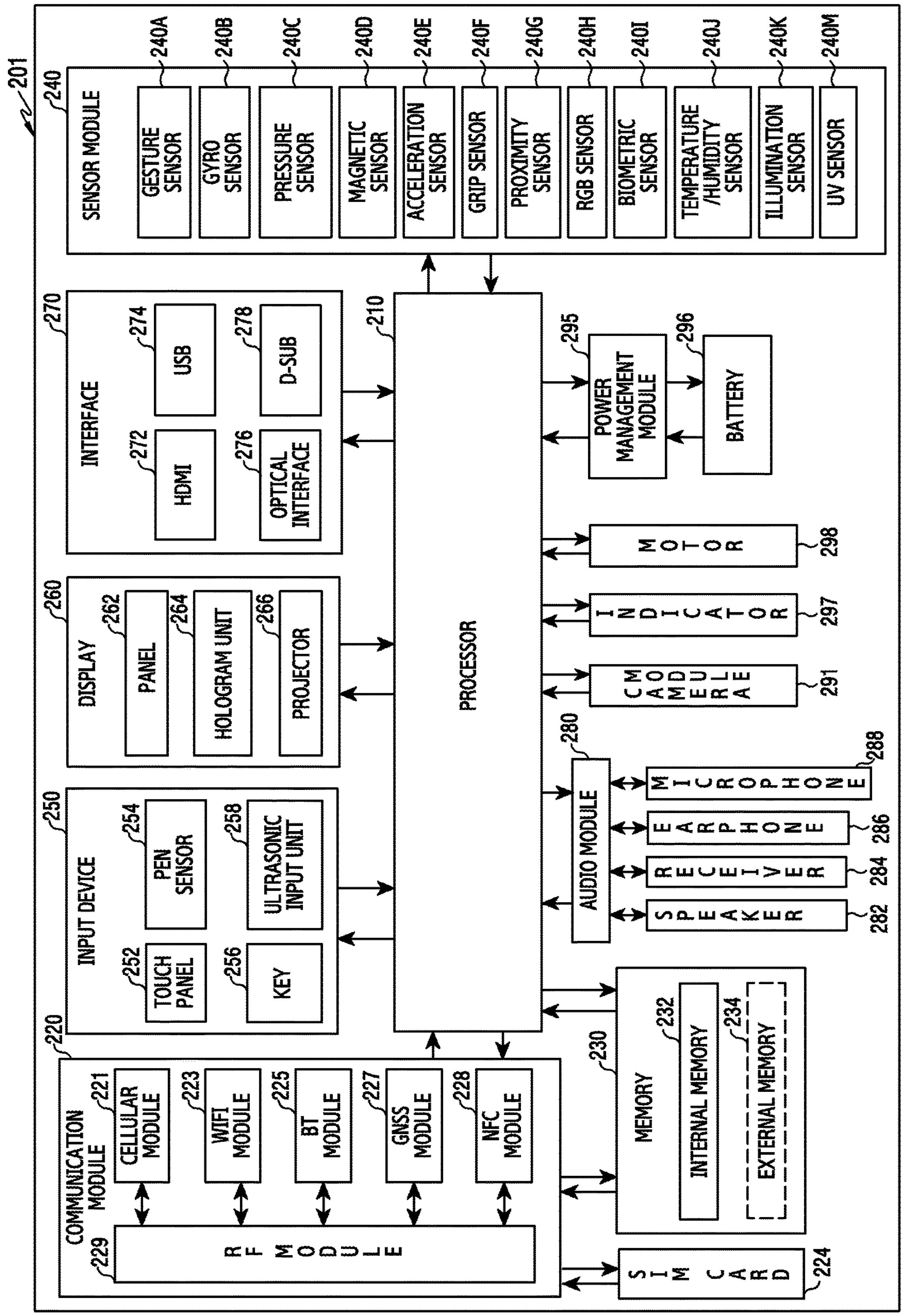
FIG. 2 illustrates a block diagram of an electronic device according to an embodiment of the present disclosure.

FIG. 2 illustrates a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system (OS) or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., a cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a BT module 225, a GNSS module 227, an NFC module 228, and an RF module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the SIM (e.g., SIM card) 224. According to an embodiment, the cellular module 221 may perform at least some functions among functions that the processor 210 may provide. According to an embodiment, the cellular module 221 may include a CP. According to some embodiment, at least some (e.g., two or more) of the cellular module 221, the WiFi module 223, the BT module 225, the GNSS module 227 or the NFC module 228 may be included within one integrated chip (IC) or IC package. The RF module 229 may, for example, transmit and receive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the BT module 225, the GNSS module 227 or the NFC module 228 may transmit and receive an RF signal through a separate RF module. The SIM 224 may, for example, include a card including a SIM and/or an embedded SIM. And, the SIM 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a random access memory (RAM) a dynamic RAM (DRAM), a static RAM (SRAM), a synchronous dynamic RAM (SDRAM) or the like) and a non-volatile memory (e.g., a read only memory (ROM), a one time programmable ROM (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a MultiMediaCard (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, and/or a control circuit for controlling them. The panel 262 may, for example, be implemented to be flexible, transparent, or wearable. The panel 262 may be constructed as one or more modules together with the touch panel 252. The hologram device 264 may show a three-dimensional image to the air using an interference of light. The projector 266 may project light onto a screen, to display an image. The screen may, for example, be located inside or outside the electronic device 201. The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/MMC interface or an Infrared Data Association (IrDA) standard interface.

The audio module 280 may, for example, convert a sound and an electrical signal interactively. At least some constituent elements of the audio module 280 may be, for example, included in the input/output interface 150 illustrated in FIG. 1. The audio module 280 may for example, process sound information that is inputted or outputted through a speaker 282, a receiver 284, an earphone 286, the microphone 288 or the like. The camera module 291 is, for example, a device able to photograph a still image and a video. According to an embodiment, the camera module 291 may include one or more image sensors (e.g., front sensor or rear sensor), a lens, an ISP or a flash (e.g., an LED, a xenon lamp or the like). The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
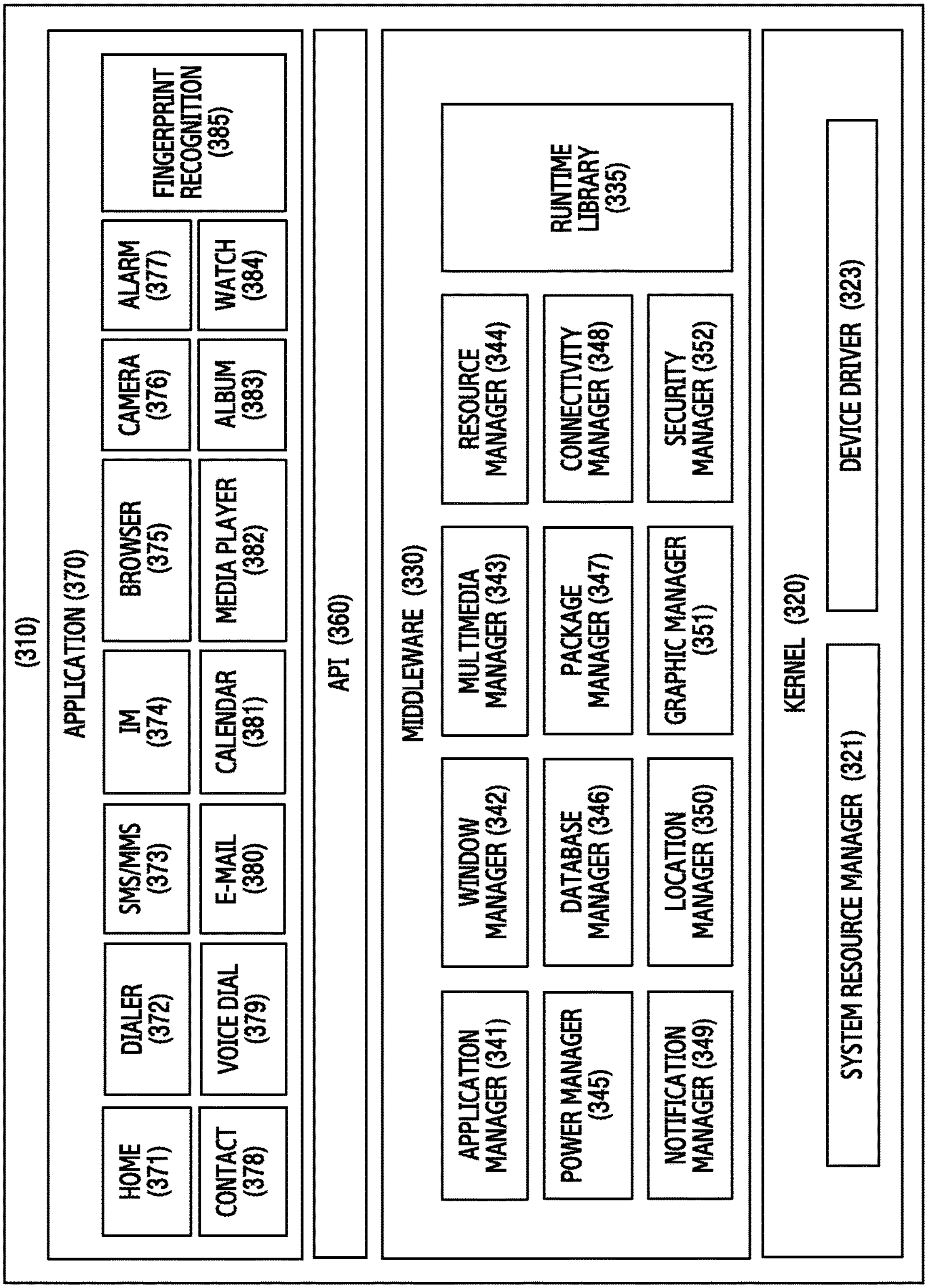
FIG. 3 illustrates a block diagram of a program module according to an embodiment of the present disclosure.

FIG. 3 illustrates a block diagram of a program module according to an embodiment of the present disclosure.

Referring to FIG. 3, a program module 310 (e.g., the program 140) may include an OS for controlling resources related to an electronic device (e.g., the electronic device 101) and/or various applications (e.g., the application program 147) driven on the OS. The OS may, for example, include Android™, iOS™, Windows™, Symbian™, Tizen™ or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the first and second external electronic devices 102 and 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a BT driver, a shared memory driver, a USB driver, a keypad driver, a WiFi driver, an audio driver or an inter-process communication (IPC) driver. The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing. The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication. According to an embodiment, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an OS. The middleware 330 may dynamically delete some of the existing constituent elements or add new constituent elements. The API 360 is, for example, a set of API programming functions, and may be provided to have another construction in accordance with the OS. For example, Android or iOS may provide one API set by platform, and Tizen may provide two or more API sets by platform.

The application 370 may, for example, include a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application. Also, the application 370 may include a fingerprint recognition application 385 for fingerprint recognition. According to an embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to an embodiment, the application 370 may include an application (e.g., a health care application of a mobile medical instrument) designated according to an attribute of the external electronic device. According to an embodiment, the application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term “module” used in the present document may include a unit consisting of hardware, software or firmware and, for example, may be used interchangeably with the terms “logic”, “logic block”, “component”, “circuit” or the like. The “module” may be an integrally configured component or the minimum unit performing one or more functions or a part thereof. The “module” may be implemented mechanically or electronically and, for example, may include an application-specific integrated circuit (ASIC) chip, field-programmable gate arrays (FPGAs) or a programmable logic device, which has been known or will be developed in future, performing some operations. At least a part of an apparatus (e.g., modules or functions thereof) or method (e.g., operations) according to various embodiments may, for example, be implemented by an instruction that is stored in a computer-readable storage media in the form of a program module. In case where the instruction is executed by a processor (e.g., the processor 120), the processor may perform a function corresponding to the instruction. The computer-readable recording media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include a code that is made by a compiler or a code that is executable by an interpreter. The module or program module according to various embodiments may include at least one or more of the aforementioned constituent elements, or omit some, or further include another constituent element. Operations carried out by the module, the program module or the another constituent element according to various embodiments may be executed in a sequential, parallel, repeated or heuristic manner, or at least some operations may be executed in different order or be omitted, or another operation may be added.

Figure 4:
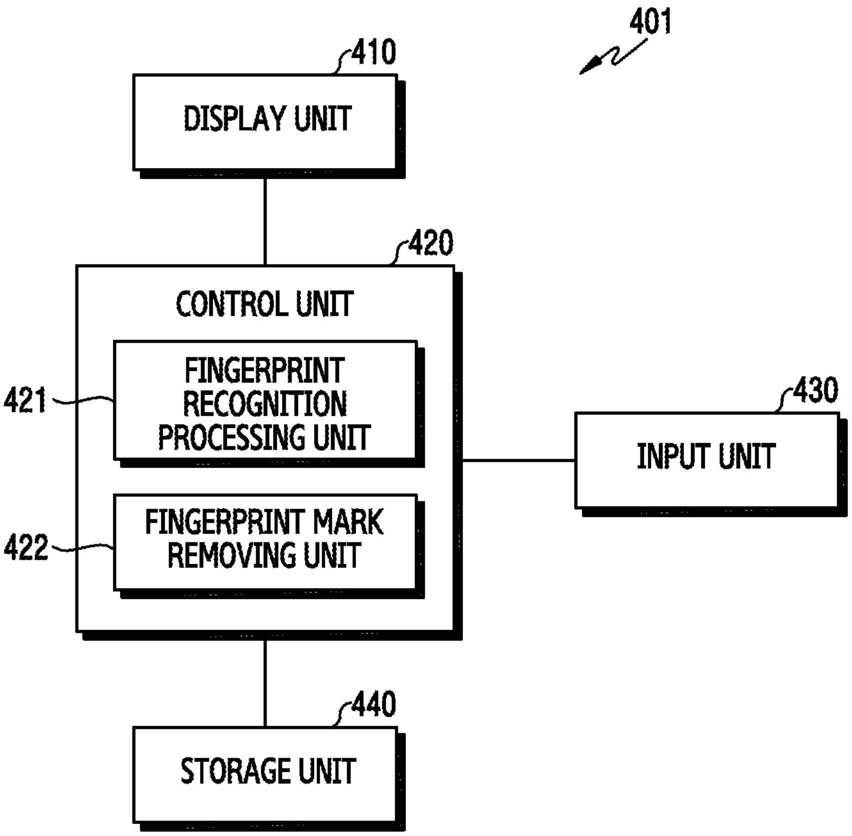
FIG. 4 illustrates a functional block diagram of an electronic device according to an embodiment of the present disclosure.

FIG. 4 illustrates a functional block diagram of an electronic device according to various embodiments of the present disclosure.

Referring to FIG. 4, the electronic device 401 according to various embodiments of the present disclosure may include a display unit 410, a control unit 420, an input unit 430, and a storage unit 440.

The display unit 410 may perform a display function based on the control of the control unit 420. More specifically, the display unit 410 may receive information on at least one frame for configuring a screen of the display unit 410 from the control unit 420, and display a screen by controlling a plurality of pixels included in the display unit 410 based on the information. The display unit 410 may correspond to the display 160 of FIG. 1 and the display 260 of FIG. 2.

The control unit 420 may control the overall operation of the electronic device 401. The control unit 420 may control components (e.g., the display unit 410, the input unit 430, the storage unit 440, and the like) for performing functions of the electronic device 401. For example, the control unit 420 may control the components of the electronic device by using data or instructions stored in the storage unit 440, and perform functions of the electronic device by controlling the components of the electronic device. The control unit 420 may include a fingerprint recognition processing unit 421 for processing fingerprint information. The control unit 420 may include a fingerprint mark removing unit 422 for determining the presence of a fingerprint mark and determining whether to display an interface for removing the fingerprint mark. The control unit 420 may correspond to the processor 120 of FIG. 1 and the processor 210 of FIG. 2.

The control unit 420 may be configured with a CPU, an AP, a microcontroller and the like. Also, the control unit 420 may be configured with one or more processors. For example, the control unit 420 may include one or more of an AP or a CP.

The input unit 430 may perform an input function of the electronic device 401. In other words, the input unit 430 may receive (or detect) an input from a user of the electronic device 401, generate a signal corresponding to the input of the user, and transmit the generated signal to the control unit 420 to perform a function according to the intention of the user. Also, the input unit 430 may include plurality of components for receiving input from the user. For example, for fingerprint recognition function, the input unit 430 may transmit a signal corresponding to fingerprint information recognized by the input unit to the control unit 420, and the control unit 420 may identify the fingerprint information based on the signal received from the input unit 430. The input unit 430 may correspond to the input/output interface 150 of FIG. 1 and the input device 250 of FIG. 2.

Figure 5A:
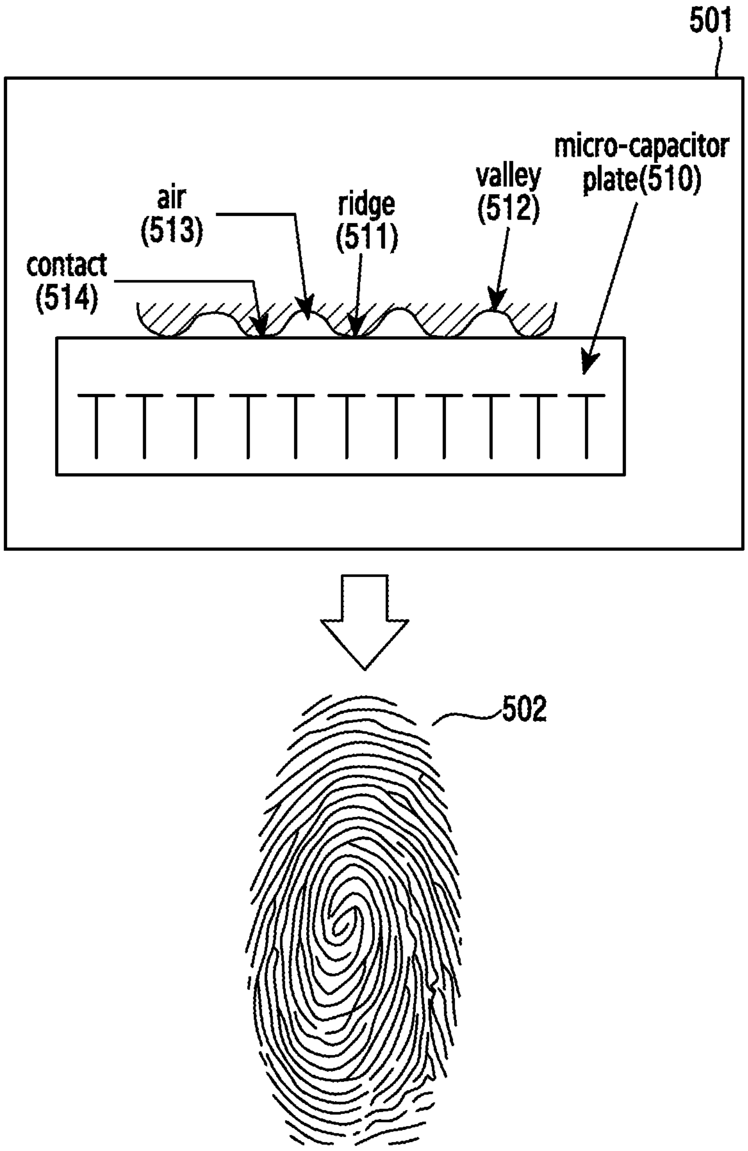
FIG. 5A illustrates a capacitive sensor for fingerprint recognition in an electronic device according to an embodiment of the present disclosure.
Figure 5B:
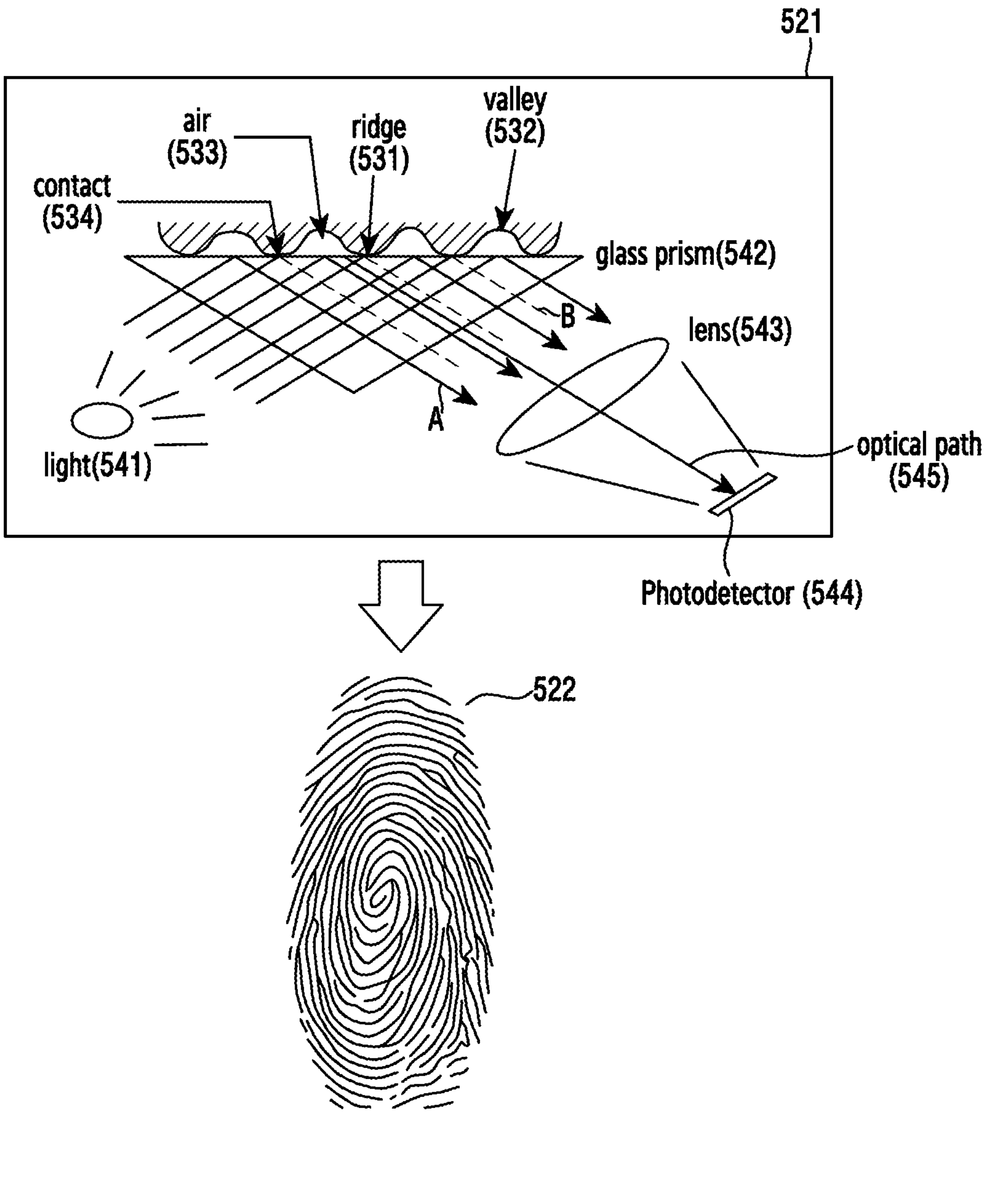
FIG. 5B illustrates an optical sensor for fingerprint recognition in an electronic device according to an embodiment of the present disclosure.
Figure 5C:
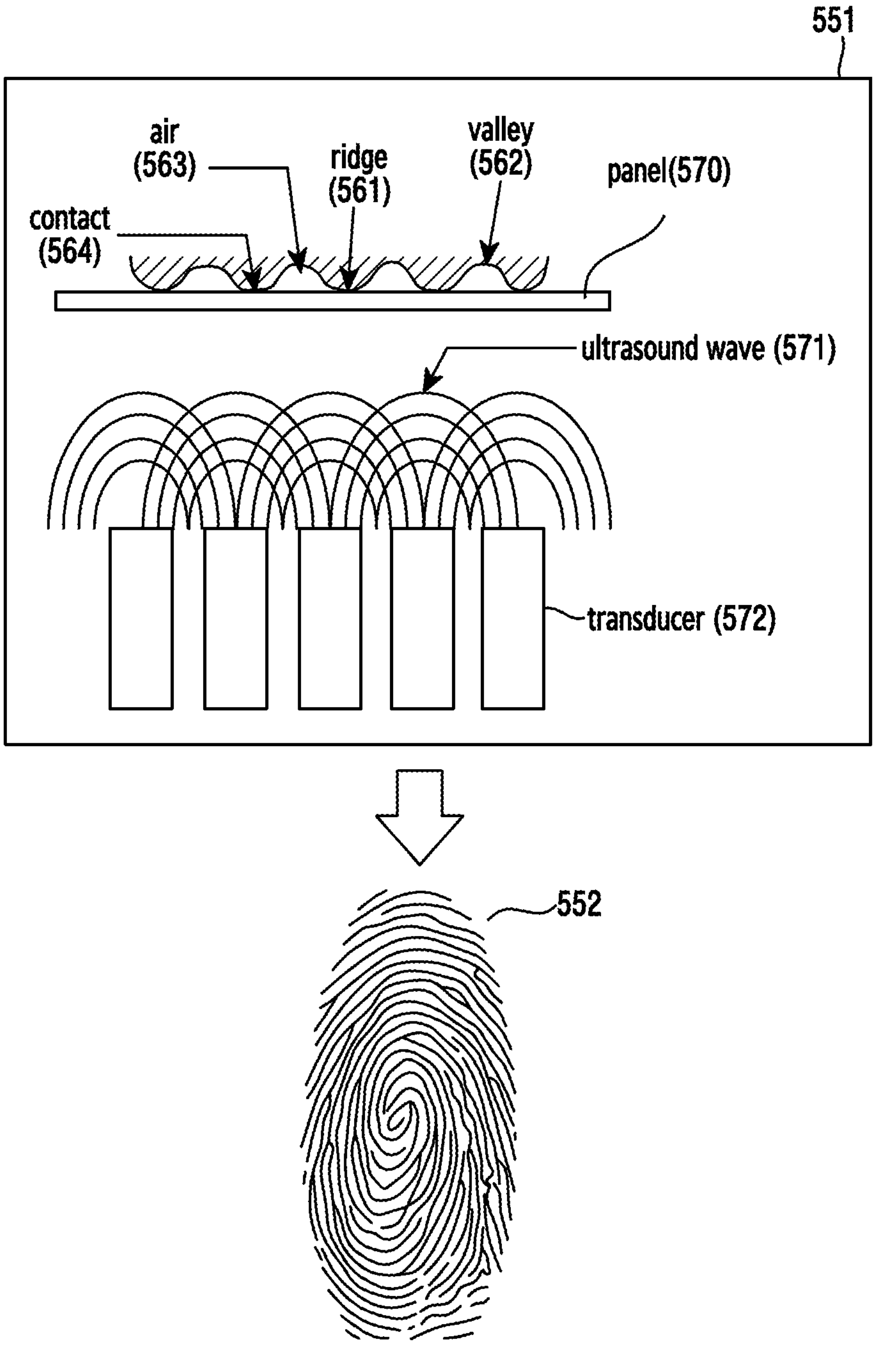
FIG. 5C illustrates an ultrasonic sensor for fingerprint recognition in an electronic device according to an embodiment of the present disclosure.

To acquire the fingerprint information, the input unit 430 may include a fingerprint sensor. The fingerprint sensor may include various sensors used for fingerprint recognition function. For example, the fingerprint sensor may include a sensor as shown in FIGS. 5A to 5C. The input unit 430 may transmit a signal corresponding to fingerprint information recognized by the fingerprint sensor to the control unit 420, and the control unit 420 may identify the fingerprint information based on the signal received from the input unit 430. The fingerprint sensor may correspond to the sensor module 240 of FIG. 2.

The storage unit 440 may store various programs for operating the electronic device 401, store downloaded data or generated data while performing the various programs. Also, the storage unit 440 may store various commands or instructions for operating the electronic device 401. The storage unit 440 may include a storage device embedded in the electronic device 401 or a storage device attachable to the electronic device 401. The storage unit 440 may correspond to the memory 130 of FIG. 1 and the memory 230 of FIG. 2.

Figure 6A:
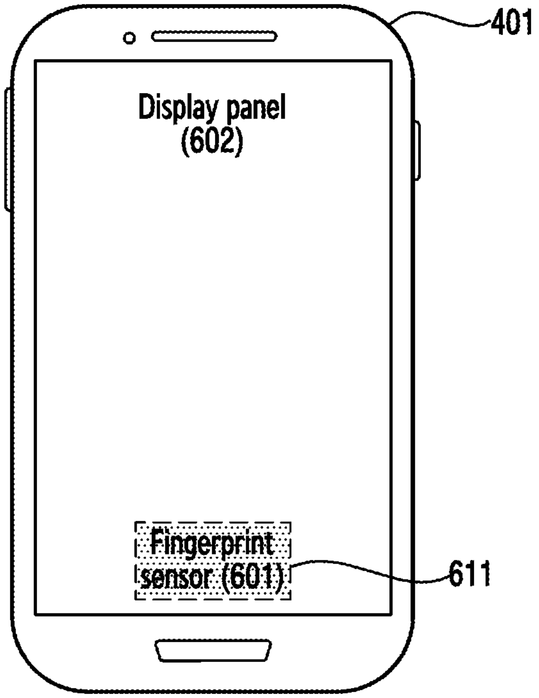
FIG. 6A illustrates an arrangement of a fingerprint sensor disposed under a touch panel of an electronic device according to an embodiment of the present disclosure.
Figure 6B:
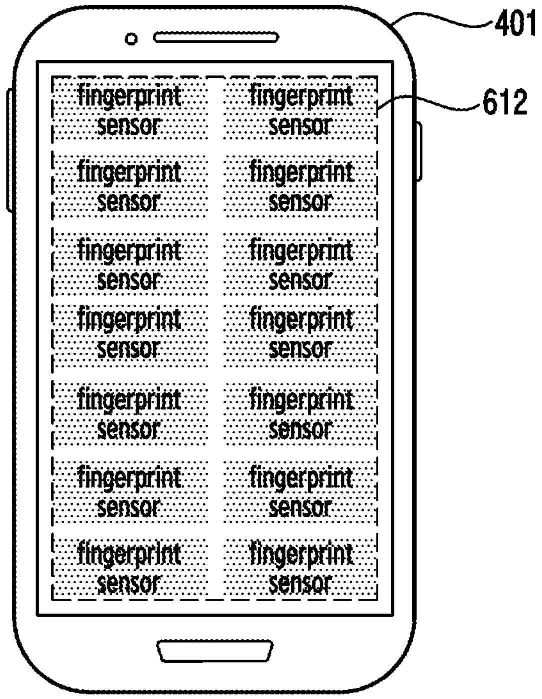
FIG. 6B illustrates an arrangement of a fingerprint sensor disposed under a touch panel of an electronic device according to an embodiment of the present disclosure.

In an embodiment of the present disclosure, at least a portion of the input unit 430 may disposed in the display unit 410. In other words, the display unit 410 and the input unit 430 may be integrated as a touch screen. For example, the fingerprint sensor disposed in the input unit 430 may be located in the display unit 410 as shown in FIG. 6A or 6B.

The display unit 410 may provide an input function as well as an output function through the touch panel of the display unit 410. For example, the display unit 410 may detect (or identify) physical characteristics (capacitance, frequency, etc.) based on the various touch inputs (e.g., tap, double tap, touch, touch move, multi touch, pressure touch, etc.) caused by an input tool (or means) such as a finger, a stylus, or an electronic pen. The display unit 410 may generate a signal for indicating the detected physical characteristics, and may transmit the generated signal to the control unit 420.

FIG. 5A illustrates a capacitive sensor for fingerprint recognition in the electronic device according to an embodiment of the present disclosure.

Referring to FIG. 5A, a capacitive sensor 501 may facilitate fingerprint recognition. The capacitive sensor 501 includes a micro-capacitor plate 510. The capacitive sensor 501 may detect voltage difference between the voltage of a point, on the micro-capacitor plate 510, corresponding to the contact point 514 where the ridge 511 of the finger surface is located and the voltage of a point, on the micro-capacitor plate 510, corresponding to the air region 513 where the valley 512 is located on the micro-capacitor plate 510. The capacitive sensor 501 may transmit the information on the voltage difference to the control unit 420, and the control unit 420 may identify the fingerprint information 502 from the information received from the fingerprint sensor.

The capacitive sensor 501 may be positioned in or under a display panel of the display unit 410, and the control unit 420 may perform fingerprint authentication for the user's finger contacted to the display unit 410. In other words, the control unit 420 may acquire the fingerprint information 502 by identifying the positions of the ridge 511 and the valley 512 through the capacitive sensor 501 from the user's finger contacted to the display unit 410. The capacitive sensor 501 may be disposed under the lower surface of the display panel of the display unit 410.

Generally, the detection sensitivity of the capacitive sensor 501 may largely be changed depending on the distance from the touch input. In other words, when a distance between a position where the capacitive sensor 501 is disposed and a position to which the user's finger is contacted is more than a specific distance, the detection sensitivity may be lowered and the accuracy of the detected fingerprint may be lower than a specific level. Therefore, in order to perform more precise detection, the capacitive sensor 501 may be disposed in a region that is relatively closer (e.g., a region having a depth of less than 50 micrometers) to the outer surface of the display panel of the display unit 410 than the other fingerprint sensors (e.g., optical sensor, ultrasonic sensor). However, the arrangement of the capacitive sensor 501 is merely an example, and the capacitive sensor 501 may be variously arranged according to the implementation.

FIG. 5B illustrates an optical sensor for fingerprint recognition in the electronic device according to various embodiments of the present disclosure.

Referring to FIG. 5B, an optical sensor 521 may facilitate fingerprint recognition. The optical sensor 521 may include a photodetector 544. The photodetector 544 may identify the position of the ridge 531 and the position of the valley 532 in the region where the user's finger is contacted based on information on the light, which is passed through the glass prism 542 and the lens 543, emitted from the light source 541.

More specifically, the light source 541 emits the light for detecting the fingerprint, and the light emitted from the light source 541 enters the glass prism 542 along the optical path 545. When the light entered into the glass prism 542 reaches the air region 533 where contact is not occurred, the light is regularly reflected with an angle of reflection equal to the incident angle and forms an optical path A. On the other hand, when the light entered into the glass prism 542 reaches the contact region 534 where contact is occurred, the light is not reflected but absorbed and does not form an optical path B. The light reflected from the air region 533 is refracted through the lens 543 and reaches the photodetector 544. The photodetector 544 may identify the region where the light arrives as the region where the valley 532 is located and the region where the light does not arrive as the region where the ridge 531 is located. The control unit may identify the fingerprint information 522 from the information on the positions of the ridge 531 and the valley 532.

Since the optical sensor 521 uses light, the optical sensor 521 may be disposed in a region that is deeper from the outer surface of the display panel of the display unit 410 than the capacitive sensor 501 shown in FIG. 5A. For example, the photodetector 544 may be spaced apart from the surface of panel of the display unit 410 by 100 micrometers.

The photodetector 544 may be configured with a charge coupled device (CCD) or a complementary metal-oxide-semiconductor (CMOS).

FIG. 5C illustrates an ultrasonic sensor for fingerprint recognition in the electronic device according to an embodiment of the present disclosure.

Referring to FIG. 5C, an ultrasonic sensor 551 may facilitate fingerprint recognition at a contact point 564 on the location of a ridge 561 and an air region 563 where a valley 562 is located on the display panel 570. The ultrasonic sensor 551 includes at least one transducer 572. The at least one transducer 572 may emit an ultrasonic signal 571 toward the display panel 570 of the electronic device 401, and may generate a signal for identifying a touch pattern on the display panel 570 by converting the ultrasonic signal reflected from the display panel 570 into an electric signal. More specifically, an ultrasonic signal 571 reflected from the region where the ridge 561 is located arrives to the transducer 572 earlier than an ultrasonic signal reflected from the region where the valley 562 is located. The transducer 572 may generate the electric signal based on the difference between timings at which the ultrasonic signals arrive. The transducer 572 may transmit the generated electric signal to the control unit 420 of the electronic device 401, and the control unit 420 may acquire fingerprint information 552 from the transmitted signal.

Generally, the ultrasonic sensor 551 may have a larger volume relative to the capacitive sensor 501 or the optical sensor 521, or may be located within a wider range relative to the capacitive sensor 501 or the optical sensor 521. Therefore, the ultrasonic sensor 551 may be disposed in a region that is deeper from the outer surface of the display panel of the display unit 410 than the capacitive sensor 501 shown in FIG. 5A and the optical sensor 521 shown in FIG. 5B.

FIG. 6A illustrates an arrangement of a fingerprint sensor disposed under a touch panel of an electronic device according to an embodiment of the present disclosure.

Referring to FIG. 6A, a fingerprint sensor 601 may correspond to one or more of the capacitive sensor 501 of FIG. 5A, the optical sensor 521 of FIG. 5B, or the ultrasonic sensor 551 of FIG. 5C. The fingerprint sensor 601 is located in a partial area 611 of the display panel 602, and the fingerprint recognition of the electronic device 401 is performed through the partial area 611. In this case, the display unit 410 of the electronic device 401 may display a user interface (e.g., GUI) for removing a fingerprint mark (or a fingerprint trace) in the partial area 611. By positioning the fingerprint sensor 601 in the partial area 611 instead of the entire area of the display panel, the manufacturing cost can be reduced. Also, according to the embodiment of FIG. 6A, since the area for identifying the fingerprint mark or the area for displaying the user interface for removing the fingerprint mark is predefined, the processing for preventing fingerprint stealing (or finger abstraction, finger extraction) can be performed more quickly.

FIG. 6B illustrates an arrangement of a fingerprint sensor disposed under a touch panel of the electronic device according to an embodiment of the present disclosure.

Referring to FIG. 6B, the fingerprint sensor 601 may correspond to one or more of the capacitive sensor 501 of FIG. 5A, the optical sensor 521 of FIG. 5B, or the ultrasonic sensor 551 of FIG. 5C. The fingerprint sensor 601 is located in an entire area 612 of the display panel 602. The fingerprint recognition is performed through the entire area 612. The control unit 420 of the electronic device 401 may determine the region where the fingerprint mark is present among the entire area, and the display unit 410 of the electronic device 401 may display the user interface for removing a fingerprint mark in the determined region. By positioning the fingerprint sensor 601 in the entire area 612 instead of the partial area 611 of the display panel 602, the user experience (UX), (i.e., usability) can be increased since the fingerprint can be inputted anywhere in the display panel 602.

Although the fingerprint sensor 601 is disposed in or under the display panel 602 in the embodiments of FIGS. 6A and 6B, the fingerprint sensor 601 may be variously positioned in the electronic device 401. For example, the fingerprint sensor 601 may be located in the home button of the electronic device or may be located on inner surface of the side part or inner surface of rear part of the electronic device. In another embodiment, the fingerprint sensor 601 may be located in another electronic device connected to the electronic device, and display the user interface for removing a fingerprint mark on the another electronic device in order to prevent fingerprint mark stealing from the another electronic device.

Hereinafter, the operation of the electronic device 401 for removing fingerprint marks will be described with reference to FIGS. 7 to 16. Although the following description is based on the electronic device 401 of FIG. 4, it may be performed by the electronic device 101 of FIG. 1 or the electronic device 201 of FIG. 2. In other words, the following embodiments may be performed by components of the electronic device 101 of FIG. 1 or the electronic device 201 of FIG. 2 that substantially correspond to the components of the electronic device 401 of FIG. 4.

Figure 7:
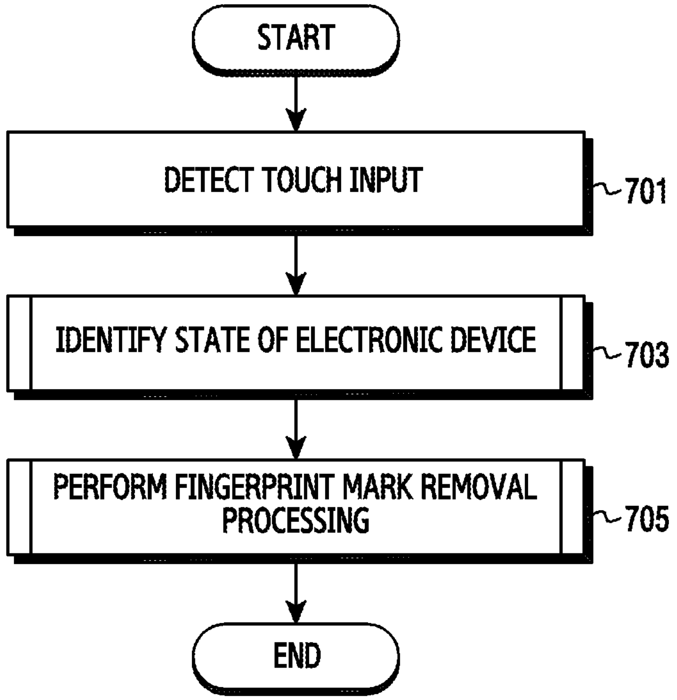
FIG. 7 illustrates an operation of an electronic device according to an embodiment of the present disclosure.

FIG. 7 illustrates an operation of an electronic device according to an embodiment of the present disclosure.

Figure 17:
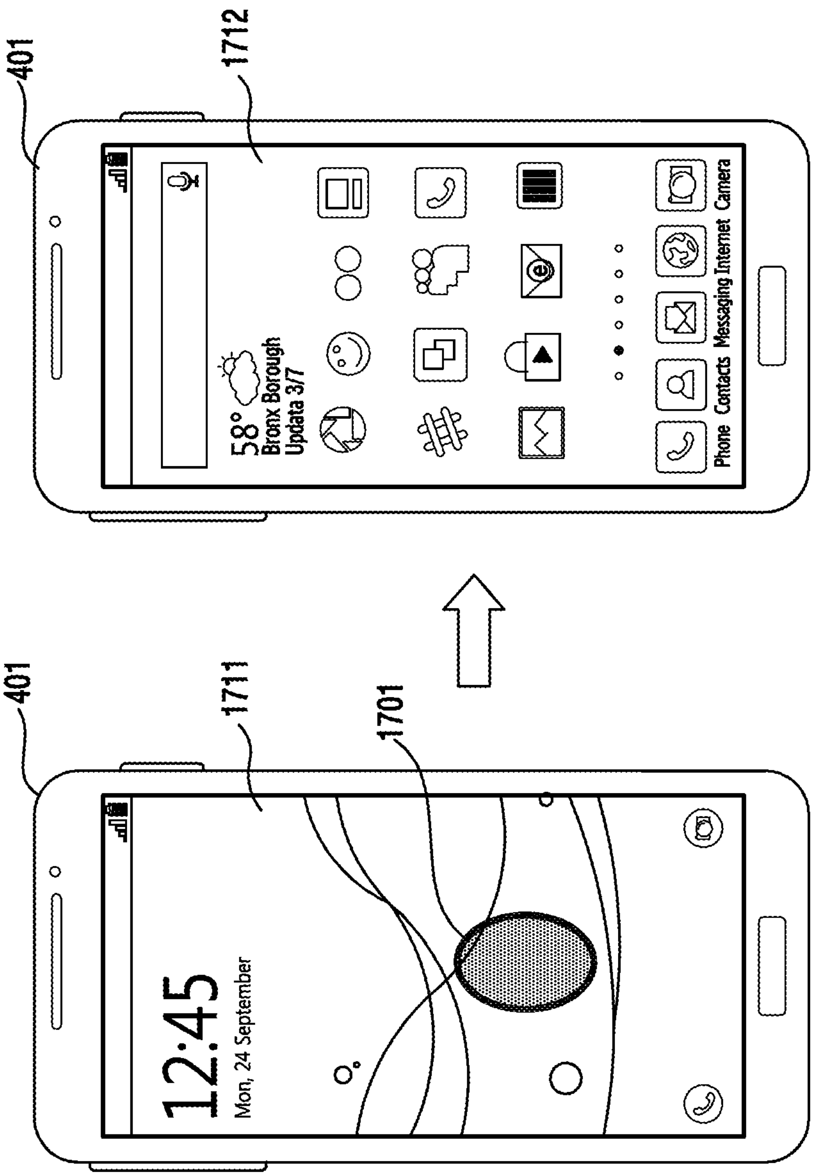
FIG. 17 illustrates a user interface for access through fingerprint recognition in an electronic device according to an embodiment of the present disclosure.
Figure 18:
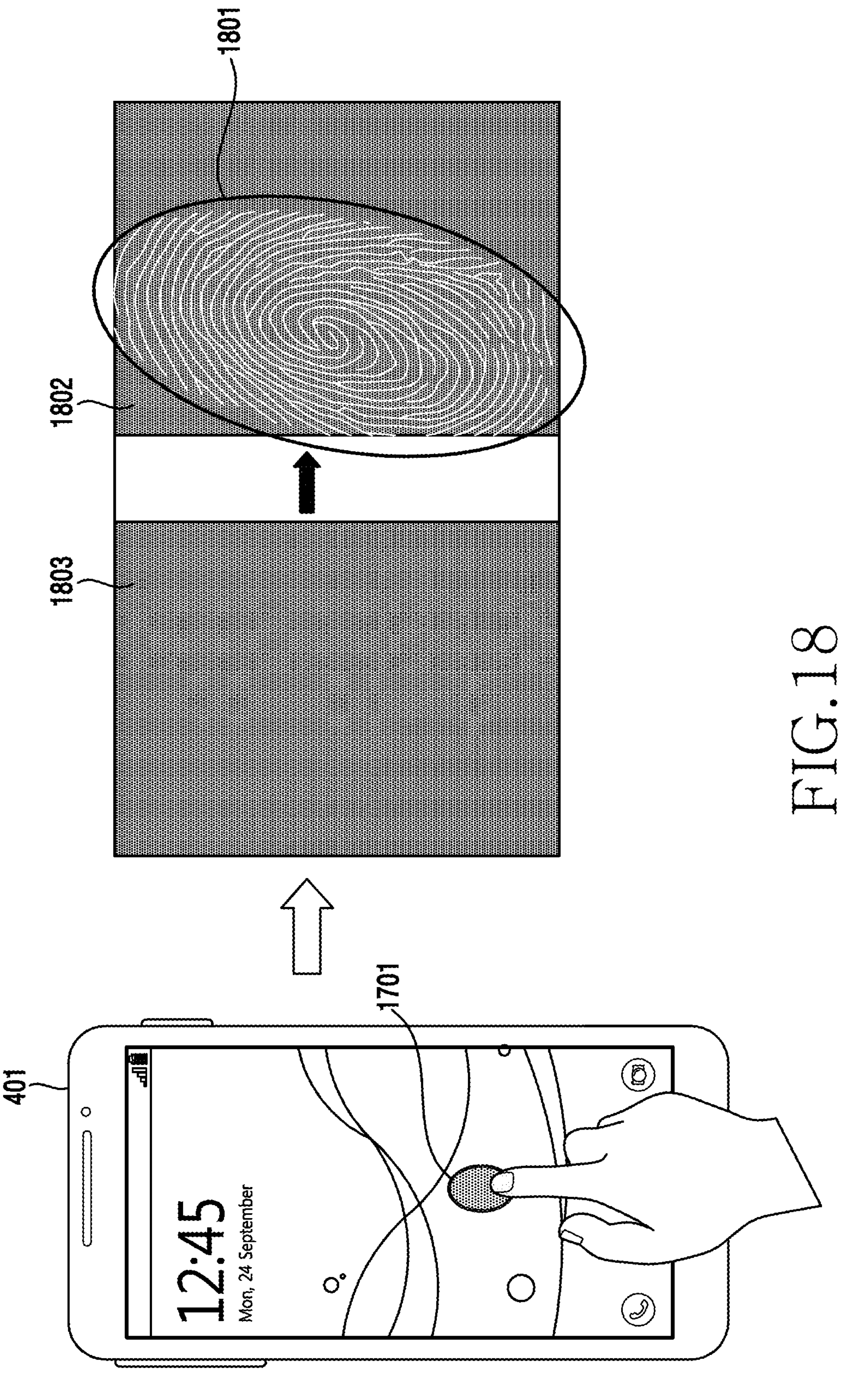
FIG. 18 illustrates a fingerprint mark in a state where the fingerprint mark is capable of being stolen in an electronic device according to various embodiments of the present disclosure.

Referring to FIG. 7, in operation 701, the fingerprint recognition processing unit 421 of the electronic device 401 may detect a touch input on the electronic device through the fingerprint sensor 601. The touch input may include a touch input for switching the operation mode of the electronic device 401 from a lock mode to an unlock mode as shown in FIG. 17. Referring to FIGS. 17 and 18, the electronic device 401 may display a screen 1711 indicating that the electronic device 401 is operating in the lock mode. Fingerprint recognition may be performed based on a touch input received via a partial area 1701 of the display unit 410, and the lock mode can be released according a result the fingerprint recognition. After the lock mode is released, the electronic device may switch to the unlock mode and display the main screen 1712.

FIG. 17 illustrates a user interface for access through fingerprint recognition in an electronic device according to an embodiment of the present disclosure. FIG. 18 illustrates a fingerprint mark in a state where the fingerprint mark is capable of being stolen in an electronic device according to various embodiments of the present disclosure.

Referring to FIGS. 17 and 18, an example of a fingerprint mark is illustrated that is caused by a touch input generated during the fingerprint authentication process for unlock. In this example, the touch input in the operation 701 in FIG. 7 may include a touch input for executing security mode, proceeding payment, or a personal authentication procedure. Also, the touch input in the operation 701 of FIG. 7 includes a touch input that is inputted during an operation of the electronic device 401. For example, the touch input in the operation 701 includes not only a touch input inputted in the process of executing an application of the electronic device 401 but also a long press touch associated with the function of the electronic device 401 or a force touch, which is distinguished according to a pressure in the electronic device 401.

In the case of fingerprint recognition through the touch on the display panel 602 as shown in FIGS. 17 and 18, there is a high risk that the fingerprint is stolen. Unlike the examples of FIGS. 17 and 18, in the case that the fingerprint sensor is located at the home button, the fingerprint sensor located at the home button or around the home button may be generally configured with a capacitive sensor. In this case, a fingerprint mark may be captured using a sticky material having fat or oil as an ingredient at the home button. Next, the captured fingerprint mark 1801 may be transferred to an electric charge sensitive material (e.g., AgIC4 silver conductive ink). Finally, the shape of the fingerprint can be acquired through the electric charge sensitive material.

However, in the case that the fingerprint mark is present at the partial area 1701 of the display panel 602, it is possible to capture an image 1803 for the fingerprint mark presented at the partial area 1701. Next, a fingerprint image 1802 of FIG. 18 can be obtained by performing a simple image processing (e.g., contrast enhancement) on the image 1803 for the fingerprint mark, without additional physical procedures. In other words, while the fingerprint sensor 601 is located at the display panel 602, the user can conveniently perform the fingerprint recognition, the risk of the fingerprint stealing increases. Particularly, in the case that the electronic device 401 of FIG. 4 is a public device that can be used by unspecified number of people, the risk is further increased.

Referring back to FIG. 7, in order to prevent the fingerprint from being stolen, in operation 703 of FIG. 7, the control unit 420 may determine whether there is a risk that fingerprints may be stolen. In operation 703, the control unit 420 of the electronic device 401 may determine whether the electronic device 401 is a public device commonly used by a plurality of users. The public device may refer to a device that is configured to be accessible by an unspecified number of users, unlike a personal device that is configured to allow access only to a specific user or a specific user group. For example, the public device may include at least one of a desktop PC, a laptop PC, a tablet, a medical device, an ATM, or a kiosk located in a public place. The control unit 420 may determine whether the electronic device 401 is a public device based on at least one of the type, the user log, or the location of the electronic device 401. An example of the process for determining whether the electronic device 401 is a public device may be performed as the operations to be described by FIGS. 8 to 12.

In operation 703, the control unit 420 may determine whether the electronic device is in a state in which the fingerprint mark according to a touch input is at risk of being stolen. In an embodiment, when the touch input received through the display unit 410 stays long enough at one point, the control unit 420 may determine that the electronic device is in a state in which there is a risk that the fingerprint mark caused by the touch input can be stolen. For example, the control unit 420 may detect amount of change of touch tower (long/short axis) information or touch coordinate information of the touch input. When the amount of change is less than a specific value, the control unit 420 may determine that the electronic device is in a state in which there is a risk of fingerprint mark being stolen. In another embodiment, the control unit 420 may determine that the electronic device is in a state in which there is a risk of fingerprint mark being stolen when a pressure due to the touch input is detected but a movement of the touch input is not detected.

In some embodiments, operation 703 of FIG. 7 may be omitted. In other words, the control unit 420 may perform an operation for removing the fingerprint mark regardless of whether the electronic device is in a state in which there is a risk of fingerprint mark being stolen.

Then, in operation 705, the control unit 420 may perform processing for removing the fingerprint mark. In operation 705, the fingerprint recognition processing unit 421 of the control unit 420 may determine whether a fingerprint mark is left on the electronic device 401. The fingerprint mark is a physical trace formed similar to the shape of the user's fingerprint from a material that is on the surface of the electronic device 401 or on the surface of the user's finger. The fingerprint mark may be identified by the fingerprint sensor 601. The process for removing the fingerprint mark in operation 705 may be performed as the operations to be described by FIGS. 13 to 15.

The process for removing the fingerprint mark in operation 705 may include an operation displaying a user interface that guides removing the fingerprint mark. For example, the user interface that guides removing the fingerprint mark may be a user interface that guides or induces a specific gesture (e.g., a swipe gesture) on the location where the fingerprint mark is present. Also, the user interface may be configured to disappear on condition of receiving a touch input of at least one of a designated intensity or more, a designated distance or more, or a designated number or more.

Figure 19:
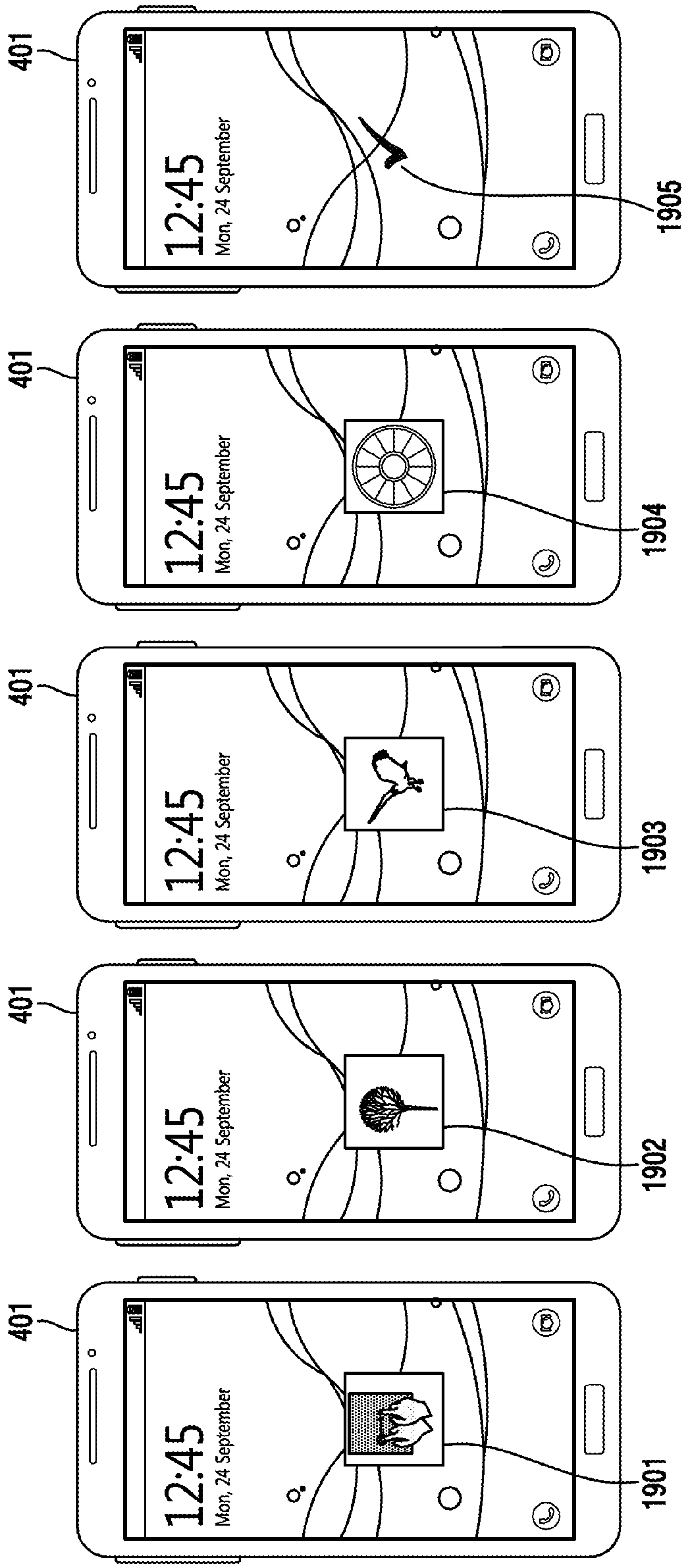
FIG. 19 illustrates a user interface that guides to remove a fingerprint mark from an electronic device according to various embodiments of the present disclosure.

FIG. 19 illustrates a user interface that guides to remove a fingerprint mark from an electronic device according to various embodiments of the present disclosure.

Referring to FIG. 19, examples are illustrated of user interfaces guiding a specific gesture on the location where the fingerprint mark is present. A user interface 1901 of FIG. 19 is an example of an interface that guides a simple cross swipe gesture. The user interface 1901 can derive the removal of the fingerprint mark by guiding that the user performs a swipe gesture on the location of the user interface 1901. Also, the user interface 1901 may be configured to disappear on condition of receiving a gesture input corresponding to the user interface 1901. For example, the interface 1901 may be configured to disappear on condition of that a touch input with designated pressure is repeatedly swiped a designated number of times or more within the area of the user interface 1901.

The user interface 1902 of FIG. 19 shows an example of a user interface, which guides a touch input for animation (or visual effect) in which a plurality of sub-objects (e.g., petals) in an object (e.g., flower) move, blowing the petals off the flower. The user interface 1902 may initially display the object (e.g., flower) including the plurality of sub-objects (e.g., petals). Then, the user interface 1902 may display an animation (e.g., blowing the petals off the flow) in which some of the plurality of sub-objects sequentially move (e.g., fly) while receiving the user's repetitive touch input (e.g., repetitive swipe gesture). In some embodiments, the plurality of sub-objects moved by the touch input may be configured to fade out according to moving out of the area of the user interface 1902. Also, the user interface 1902 may be configured to disappear when all of the plurality of sub-objects move out.

The user interface 1903 of FIG. 19 shows an example of a user interface that guides a touch input for animation (or visual effect) in which an object (e.g., bird) moves (e.g., fly). The user interface 1903 may initially display an object (e.g., bird). Then, when the user's touch input (e.g., swipe gesture) is received on the user interface 1903, the user interface 1903 may display the animation in which the object moves (e.g., fly) while receiving the user's touch input. In some embodiments, the object may be moved in a direction corresponding to a direction of the touch input, and may be configured to disappear when the object moves out of the area of the user interface 1903.

The user interface 1904 of FIG. 19 shows an example of a user interface that guides a touch input for animation in which an object (e.g., wheel) changes (e.g., spin). The user interface 1904 may initially display an object (e.g., wheel). Then, when the user's touch input (e.g., rotation gesture) is received on the user interface 1904, the user interface 1904 may display an animation in which the object changes (e.g., spin) while receiving the user's touch input. In some embodiments, the speed of change of the object (e.g., rotational speed) may correspond to the speed of the touch input. Also, the user interface 1904 may be configured to disappear when the object is changed more than a designated number of times (e.g., rotate more than 10 times).

The user interface 1905 of FIG. 19 shows an example of a user interface (e.g., tick marks) that guides a gesture corresponding to a specific mark (e.g., V mark). The user interface 1905 may initially display a specific mark (e.g., V mark). Then, the user interface 1905 may be configured to disappear when a gesture corresponding to the mark (e.g., V gesture) is inputted. In some embodiments, the mark may be configured to disappear when the gesture corresponding to the mark is received at a designated intensity or more.

Figure 20A:
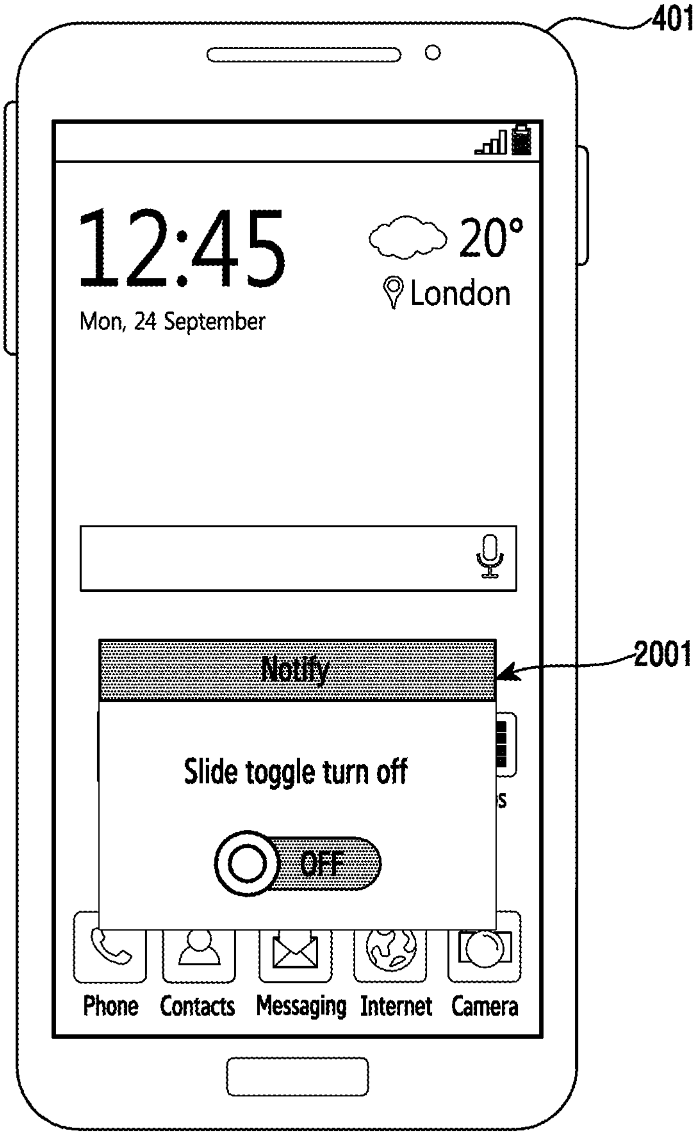
FIG. 20A illustrates a user interface that guides to remove a fingerprint mark from an electronic device according to various embodiments of the present disclosure.

FIG. 20A illustrates a user interface that guides to remove a fingerprint mark from an electronic device according to various embodiments of the present disclosure.

Referring to FIG. 20A, a user interface that guides removing the fingerprint mark may be combined with another user interface for performing a particular function of the electronic device 401. In such an example, the control unit 420 may control the display unit 410 to display a user interface 2001 including a slide toggle within the area where the fingerprint mark is present, when a mode (or state) of the electronic device 401 is switched to a lock mode (state) due to any reason (e.g., log off). The fingerprint mark can be removed by receiving a gesture corresponding to the toggle slide in the user interface. The control unit 420 may convert the operation mode of the electronic device 401 from the lock mode to the unlock mode based on determining that the fingerprint mark is removed.

Figure 20B:
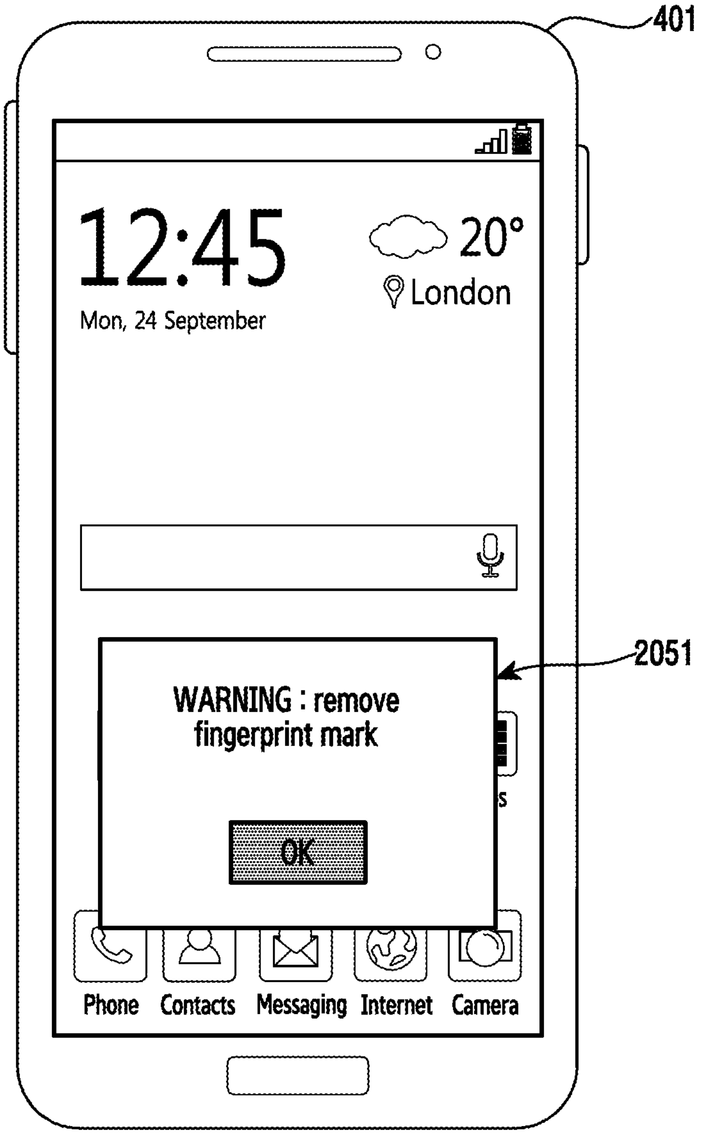
FIG. 20B illustrates a user interface that guides to remove a fingerprint mark from an electronic device according to various embodiments of the present disclosure.

FIG. 20B illustrates a user interface that guides to remove a fingerprint mark from an electronic device according to various embodiments of the present disclosure.

Referring to FIG. 20B, the user interface that guides removing the fingerprint mark may include a message notifying the presence of the fingerprint mark or guiding the removal of the fingerprint mark. In this example, the control unit 420 may control the display unit 410 to display a user interface 2051 that includes a message notifying to remove the fingerprint mark to the user. In some embodiments, the control unit 420 may control the display unit 410 to display information indicating the location of the fingerprint mark together with the message. Also, the user interface 2051 may be configured to inform that a fingerprint mark exists and to disappear upon receiving an input on a specific object (e.g., an OK button).

Although FIGS. 19, 20A, and 20B illustrate embodiments that utilize a graphical user interface to guide removal of fingerprint mark, various methods (e.g., sound or vibration) may be utilized to guide removing the fingerprint mark according to the implementation. For example, when there is a fingerprint mark, the electronic device 401 may guide to remove the fingerprint mark by vibrating the electronic device 401 or by outputting sound indicating that the fingerprint mark exists.

By performing the operations shown in FIG. 7, the electronic device 401 may remove the fingerprint mark due to the touch input of the user. By removing the fingerprint mark, it is possible to prevent the fingerprint from being stolen.

Figure 8:
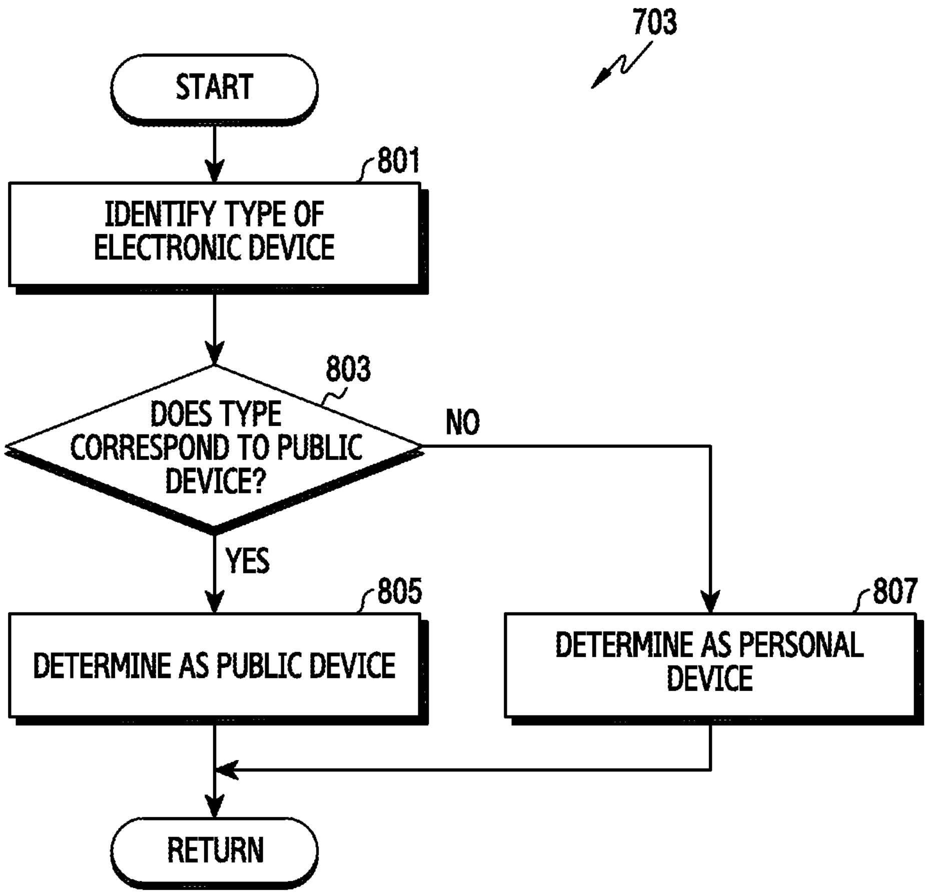
FIG. 8 illustrates an operation for determining whether a fingerprint is capable of being stolen from an electronic device according to various embodiments of the present disclosure.

FIG. 8 illustrates an operation for determining whether a fingerprint is capable of being stolen from an electronic device according to an embodiment of the present disclosure.

Referring to FIG. 8, in operation 801, the control unit 420 of FIG. 4 may identify whether a type of the electronic device 401 is configured and the type of the electronic device. The type of the electronic device 401 includes a type corresponding to a personal device for a specific user or a type corresponding to a public device for unspecified (or common) users. The type of the electronic device 401 may be preset for the electronic device, and information on the preset type of the electronic device 401 may be stored in the storage unit 440 of the electronic device. For example, the information on the type of the electronic device 401 may be configured, by the administrator, at the time of manufacture or initial setting, and may be stored in the storage unit 440 with other configuration information. The control unit 420 may identify the configuration information stored in the storage unit 440 to determine whether information on the type of the electronic device is stored in the storage unit 440. If the type of the electronic device 401 is not identified from the configuration information, the control unit 420 may perform one of the operations shown in FIGS. 9 to 12. Alternatively, if the type of the electronic device 401 is not identified from the configuration information, the control unit 420 may determine (or assume) that the electronic device corresponds to a public device.

In operation 803, the control unit 420 identifies whether the type of the electronic device 401 corresponds to a public device. If the control unit 420 identifies that the electronic device 401 is configured as a public device, the control unit 420 may determine that the electronic device 401 is a public device by proceeding to operation 805. For example, the control unit 420 may identify configuration information on the type of the electronic device 401, and when the type of the electronic device 401 is ATM, the fingerprint mark removing unit 422 may determine that the electronic device 401 is configured as a public device. If the control unit 420 identifies that the electronic device 401 is configured as a personal device, the control unit 420 may determine that the electronic device 401 is configured as a personal device by proceeding to operation 807.

The control unit 420 may determine that a fingerprint of the user of the electronic device 401 is capable of being stolen from the electronic device based on determining that the electronic device 401 is a public device. Thereafter, the control unit 420 may perform a process for removing the fingerprint mark by proceeding to operation 705 of FIG. 7.

Figure 9:
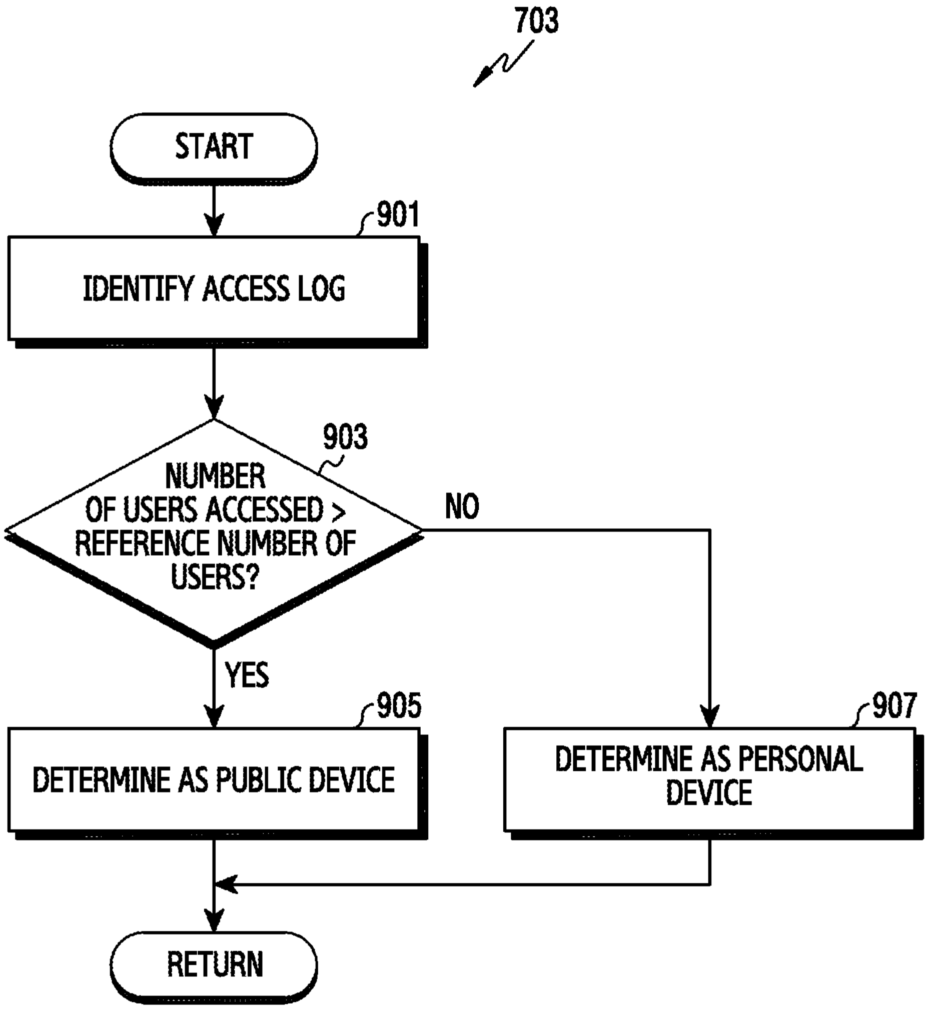
FIG. 9 illustrates an operation for determining whether a fingerprint is capable of being stolen from an electronic device according to an embodiment of the present disclosure.

FIG. 9 illustrates an operation for determining whether a fingerprint is capable of being stolen from an electronic device according to an embodiment of the present disclosure.

Referring to FIG. 9, in operation 901, the control unit 420 of FIG. 4 may identify an access log to the electronic device 401. For example, the control unit 420 may identify whether information on user access to the electronic device 401 exists or whether the information on the user access is valid. The information on the user access may include one or more of information on an identifier (ID) used for accessing the electronic device 401 or information on access time. The control unit 420 may identify whether the information on ID used for user access and the information on access time exist, and if so, the control unit 420 may identify whether the information on the user access is valid. The control unit 420 may determine whether the information on user access is valid based on the information on the access time. For example, if the last access time of the ID that accessed to the electronic device 401 is before a reference time (e.g., a month before), the control unit 420 may determine that the access to the electronic device 401 via the ID is not valid. Also, the control unit 420 may determine whether the information on user access is valid based on the number of the user access. For example, if the number of user access is less than the reference number (e.g., less than 5 times), the control unit 420 may determine that the information on user access is not valid. When the information on user access is not valid, the control unit 420 may perform the operation of FIG. 8 or 10 to 12, or may determine that the electronic device 401 is a public device.

After identifying the access log of the electronic device 401, the control unit 420 may identify the number of users accessed to the electronic device 401, and determine whether the number of users is greater than the reference number of users by proceeding to operation 903. For example, the control unit 420 may determine the number of IDs that accessed to the electronic device 401 as the number of users.

When the number of users is greater than the reference number of users (e.g., 10 people), the control unit 420 may determine that the electronic device 401 is a public device by proceeding to operation 905. In another embodiment, when the information on user access comprises repetitive accesses utilizing guest ID, the control unit 420 may determine that the electronic device 401 is a public device.

When the number of users is less than or equal to the reference number of users, the control unit 420 may determine that the electronic device 401 is a personal device by proceeding to operation 907.

When the electronic device 401 is determined as the public device, the control unit 420 may determine that the state of the electronic device 401 is a state where the fingerprint of the user is capable of being stolen. Thereafter, the control unit 420 may perform a process for removing the fingerprint mark by proceeding to operation 705 of FIG. 7.

Figure 10:
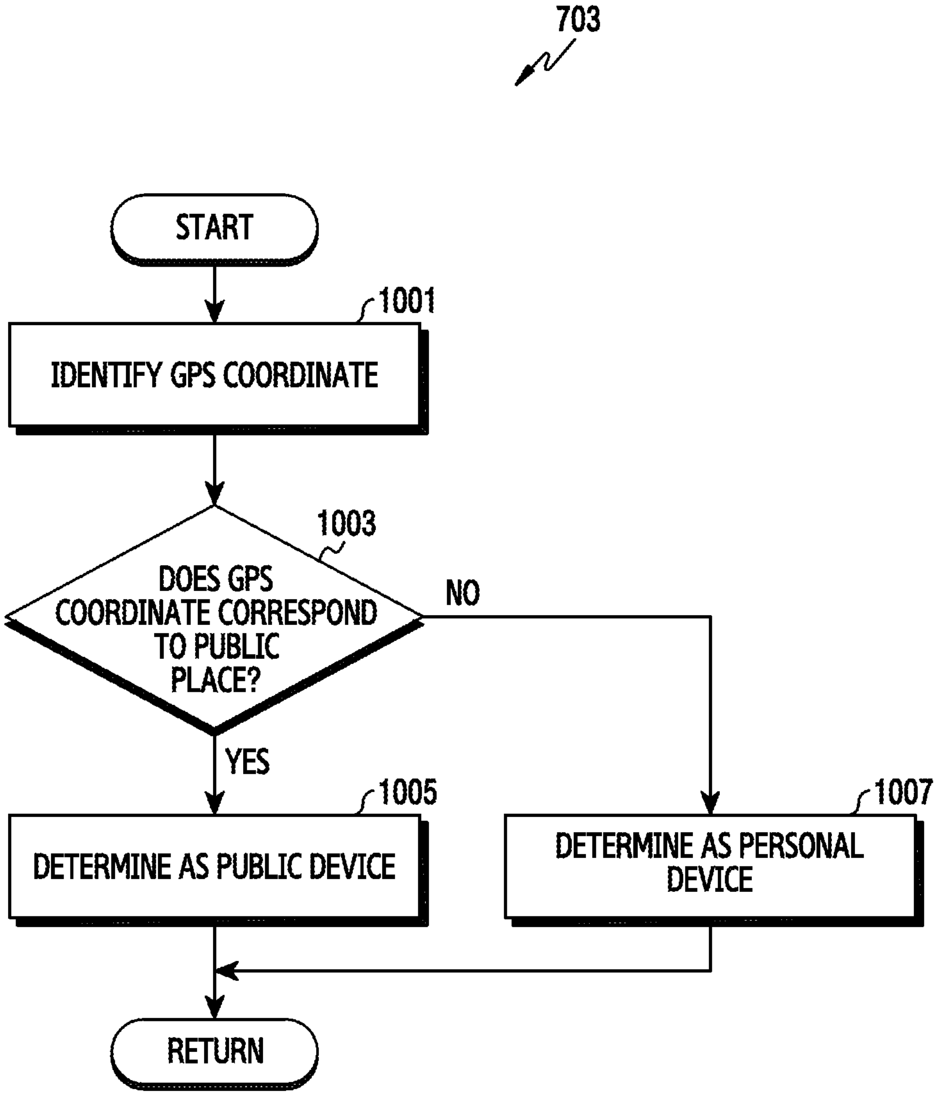
FIG. 10 illustrates an operation for determining whether a fingerprint is capable of being stolen from an electronic device according to various embodiments of the present disclosure.

FIG. 10 illustrates an operation for determining whether a fingerprint is capable of being stolen from an electronic device according to various embodiments of the present disclosure.

Referring to FIG. 10, in operation 1001, the control unit 420 of FIG. 4 may identify a GPS coordinate of the electronic device. The GPS coordinate is merely an example of information for indicating the location of the electronic device, and other information for indicating the location of the electronic device may be utilized. The electronic device 401 may include a communication unit or at least one transceiver. The transceiver is a component corresponding to the communication interface 170 of FIG. 1 or the communication module 220 of FIG. 2. The control unit 420 may identify information on the location of the electronic device 401 through the communication unit. The control unit 420 may acquire information on the GPS coordinate of the electronic device 401 through the communication unit. The control unit 420 may utilize the information on map information that is acquired from a server (e.g., server 106 of FIG. 1) connected to the electronic device or that is stored in the storage unit 440 of the electronic device.

After identifying the GPS coordinate of the electronic device 401, the control unit 420 may determine whether the electronic device 401 is located in public place by proceeding to operation 1003. For example, when a location corresponding to the GPS coordinate corresponds to a public place (e.g., bank), the control unit 420 may determine that the electronic device 401 is in a public place. In various embodiments of the present disclosure, the control unit 420 may determine whether the electronic device 401 is a public device based on whether the electronic device is located in a public place during a period longer than a reference time. For example, when the electronic device 401 is located in a public place (e.g., bank) during a period longer than a reference time (e.g., a week), the control unit 420 may determine that the electronic device 401 is a public device.

When the control unit 420 identifies that the electronic device 401 is located in the public place, the control unit 420 may determine that the electronic device 401 is a public device by proceeding to operation 1005.

When the control unit 420 identifies that the location of the electronic device is indefinite or a residential area, the control unit 420 may determine that the electronic device 401 is a personal device by proceeding to operation 1007.

When the electronic device 401 is determined as the public device, the control unit 420 may determine that the state where the fingerprint of the user is capable of being stolen. Thereafter, the control unit 420 may perform a process for removing the fingerprint mark by proceeding to operation 705 of FIG. 7.

Figure 11:
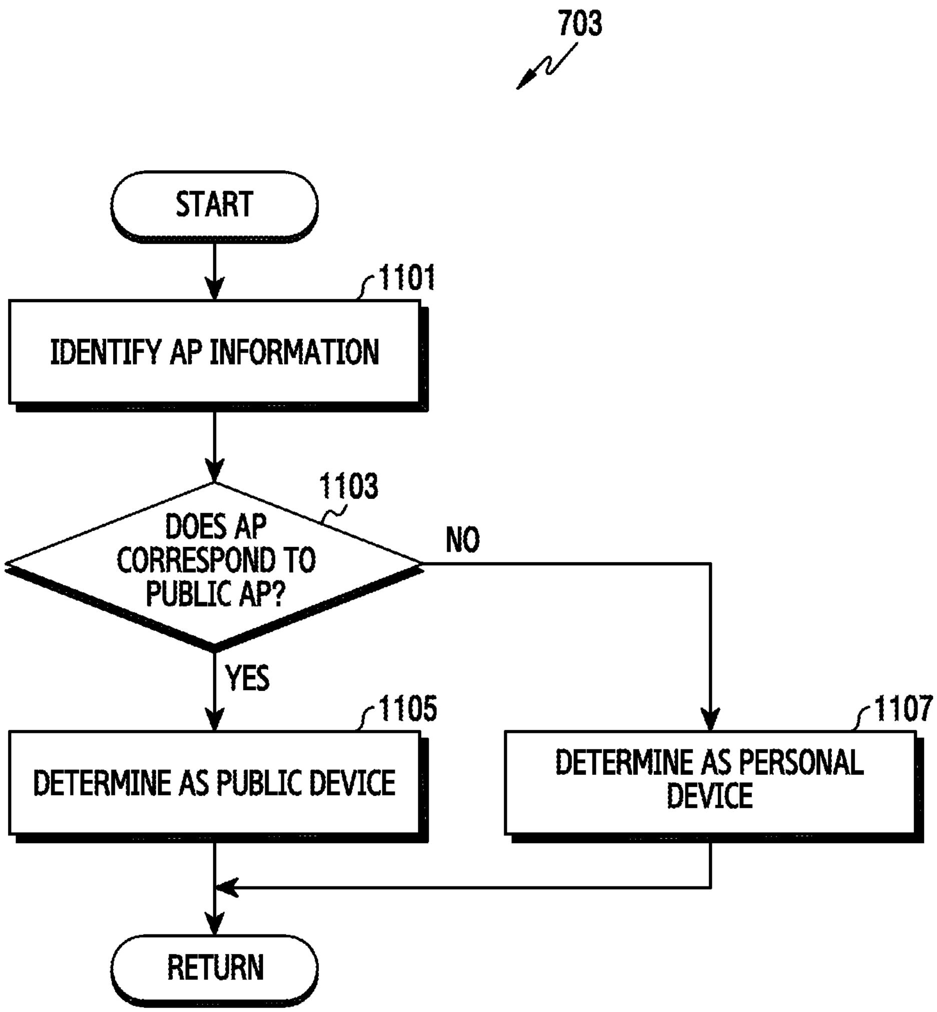
FIG. 11 illustrates an operation for determining whether a fingerprint is capable of being stolen from an electronic device according to an embodiment of the present disclosure.

FIG. 11 illustrates an operation for determining whether a fingerprint is capable of being stolen from an electronic device according to an embodiment of the present disclosure.

Referring to FIG. 11, in operation 1101, the control unit 420 of FIG. 4 may identify information regarding an access point (AP) that the electronic device accesses. When the electronic device 401 is connected to the wireless communication network through the communication unit, the fingerprint mark removing unit 422 may determine whether the electronic device 401 is a public device based on information regarding the AP or a base station that the electronic device accesses. The control unit 420 may acquire the information regarding the AP based on a signal associated with advertisement received from the AP before accessing the AP, or a signal received after accessing the AP. In another embodiment, the electronic device 401 may be connected to a mobile communication network (e.g., LTE network) and in this case, the electronic device 401 may identify information regarding the base station (e.g., eNodeB) that the electronic device 401 accesses.

Thereafter, the control unit 420 may identify whether the AP that the electronic device 401 accesses is a public AP by proceeding to operation 1103. For example, if the AP, that the electronic device 401 accesses, is configured as a public AP or if the number of electronic devices that access the AP is greater than reference number (e.g., 10), the control unit 420 may determine that the AP is a public AP.

In operation 1103, if the AP is identified as a public AP, the control unit 420 may determine that the electronic device 401 is a public device by proceeding to operation 1105. In various embodiments of the present disclosure, the control unit 420 may determine whether the electronic device 401 is a public device based on whether the electronic device accesses a public AP during a period longer than a reference time. For example, when the electronic device 401 accesses a public AP during a period longer than a reference time (e.g., two hours), the control unit 420 may determine that the electronic device 401 is a public device.

In operation 1103, in the case that the control unit 420 cannot identify information regarding the AP or identifies the AP as a personal AP, the control unit 420 may determine that the electronic device 401 is a personal device by proceeding to operation 1107.

If the electronic device 401 is determined as the public device, the control unit 420 may determine that the state of the electronic device 401 is a state where the fingerprint of the user is capable of being stolen. Thereafter, the control unit 420 may perform a process for removing the fingerprint mark by proceeding to operation 705.

Figure 12:
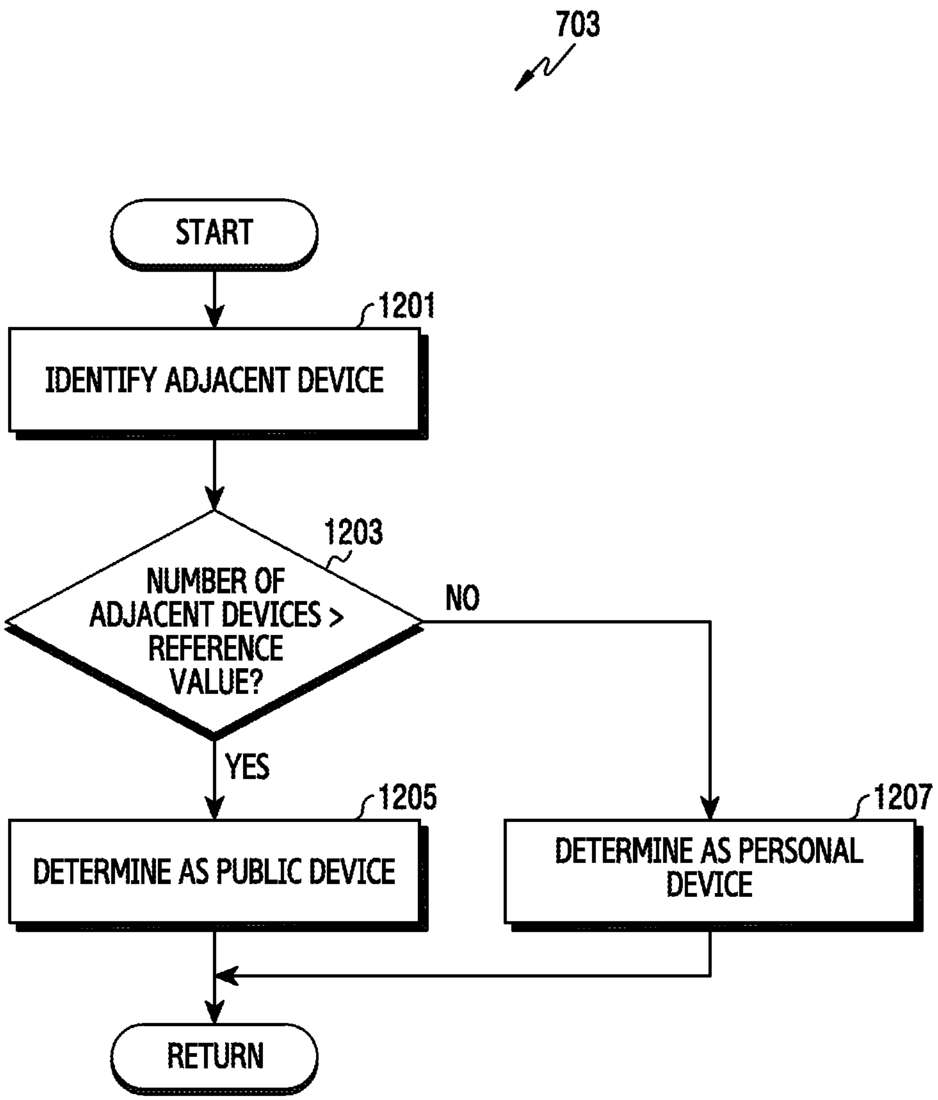
FIG. 12 illustrates an operation for determining whether a fingerprint is capable of being stolen from an electronic device according to an embodiment of the present disclosure.

FIG. 12 illustrates an operation for determining whether a fingerprint is capable of being stolen from an electronic device according to an embodiment of the present disclosure.

Referring to FIG. 12, in operation 1201, the control unit 420 of FIG. 4 may identify an adjacent device of the electronic device 401. In other words, the control unit 420 may identify an electronic device located within a designated range from the location of the electronic device 401. The control unit 420 may determine whether the electronic device 401 is located in a public place based on the number of the identified adjacent devices.

For example, the control unit 420 may identify one or more device around the electronic device as the adjacent device by using a discovery signal, which is received at the electronic device 401, for BT communication.

Thereafter, in operation 1203, the control unit 420 determines whether the number of the adjacent devices is greater than a reference value. For example, the control unit 420 may determine whether the number of the adjacent devices which are identified is greater than a reference number (e.g., 20). If the number of the adjacent devices is greater than the reference value, the control unit 420 may determine that the electronic device 401 is a public device by proceeding to operation 1205.

In operation 1203, if the number of the adjacent devices is less than or equal to the reference value, the control unit 420 may determine that the electronic device 401 is a personal device by proceeding to operation 1207.

In various embodiments of the present disclosure, the control unit 420 may determine whether the electronic device 401 is a public device based on the type of the adjacent device. For example, if the control unit 420 determines that the adjacent device is not a device that has previously communicated with the electronic device 401 or that the adjacent is a public device, the control unit 420 may determine that the electronic device 401 is a public device. If the adjacent device is frequently changed, the control unit 420 may determine that the electronic device 401 is a public device.

If the electronic device 401 is determined as the public device, the control unit 420 may determine that the state of the electronic device 401 is a state where the fingerprint of the user is capable of being stolen. Thereafter, the control unit 420 may perform a process for removing the fingerprint mark by proceeding to operation 705 of FIG. 7.

Figure 13:
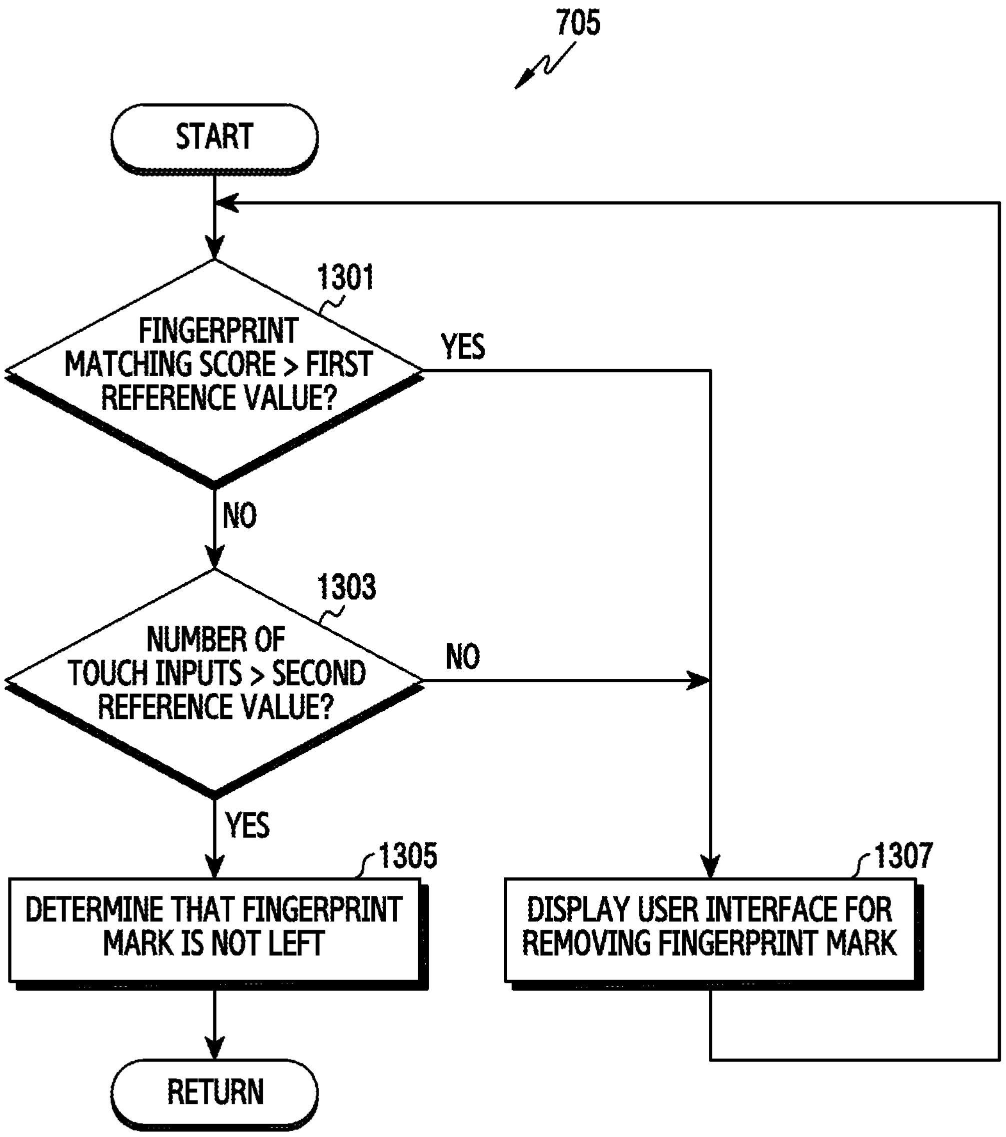
FIG. 13 illustrates an operation for determining whether a fingerprint mark exists in an electronic device according to an embodiment of the present disclosure.

FIG. 13 illustrates an operation for determining whether a fingerprint mark exists in an electronic device according to an embodiment of the present disclosure.

Figure 14:
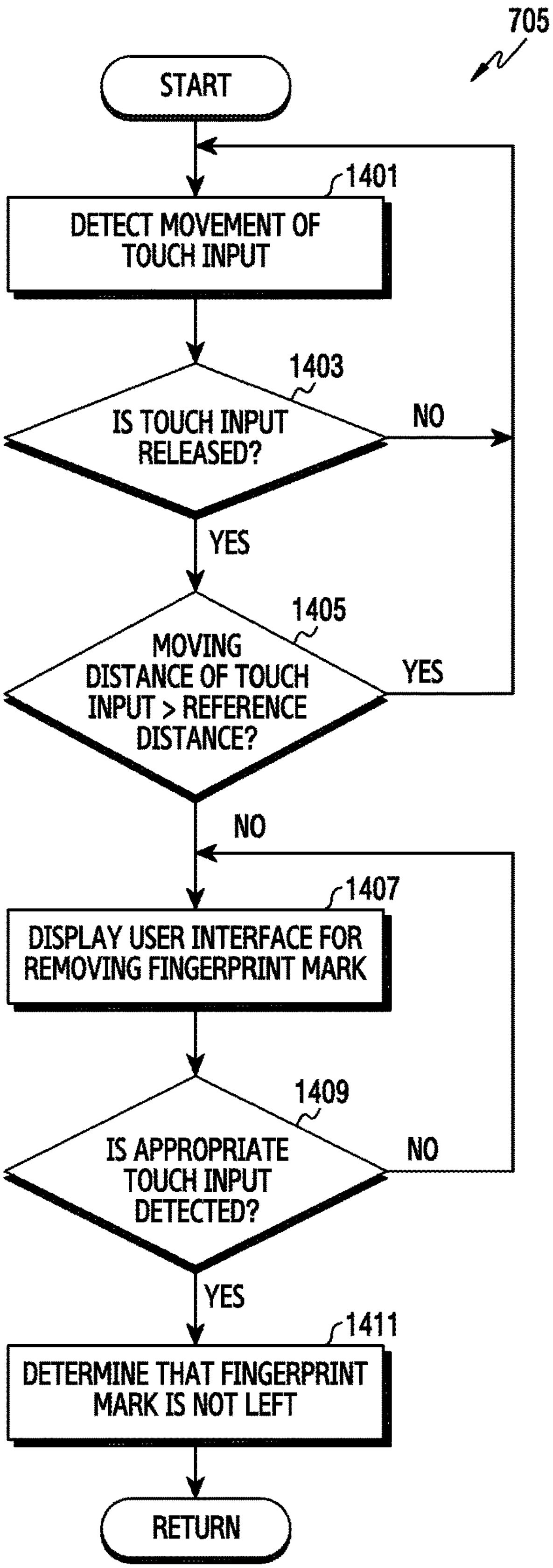
FIG. 14 illustrates an operation for determining whether a fingerprint mark exists in an electronic device according to an embodiment of the present disclosure.
Figure 15:
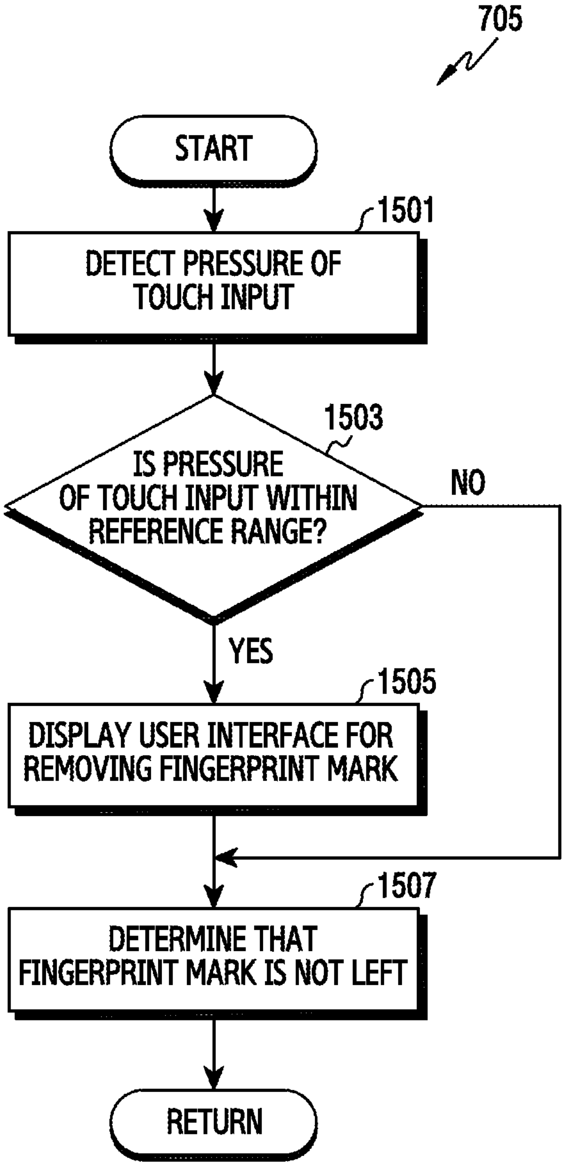
FIG. 15 illustrates an operation for determining whether a fingerprint mark exists in an electronic device according to an embodiment of the present disclosure.

The operations to be described by FIGS. 13 to 15 may be operations after determining that the state of the electronic device 401 is a state where the fingerprint of the user is capable of being stolen. For example, the operations in FIGS. 13 to 15 may be operations after determining that the electronic device 401 is a public device. However, the operations in FIGS. 13 to 15 may be performed regardless of whether or not the electronic device 401 is a public device.

Referring to FIG. 13, in operation 1301, the fingerprint recognition processing unit 421 of the control unit 420 may determine whether fingerprint matching score is greater than a first reference value in order to identify whether a fingerprint mark is present on the electronic device 401. The fingerprint matching score is a value for indicating how much the shape of the fingerprint mark on the electronic device 401 is like (or resemble) the shape of the fingerprint of the user. The shape of the fingerprint mark on the electronic device 401 can be detected through the fingerprint sensor 601. The fingerprint recognition processing unit 421 may generate the fingerprint matching score by comparing the shape of the fingerprint mark detected by the fingerprint sensor 601 and the fingerprint information acquired for user authentication. Alternatively, the fingerprint recognition processing unit 421 may generate the fingerprint matching score by comparing the shape of the fingerprint mark detected by the fingerprint sensor 601 and the fingerprint information stored in the storage unit 440 of FIG. 4. The fingerprint recognition processing unit 421 compares the generated fingerprint matching score with the first reference value for determining whether the fingerprint mark exists. The first reference value may be a value for determining whether the fingerprint mark is present on the electronic device 401. According to embodiments, the first reference value may be a preset value stored in the storage unit 440.

When the fingerprint matching score is less than or equal to the first reference value, the fingerprint mark removing unit 422 may, by proceeding to operation 1303, determine whether the number of touch inputs on the electronic device 401 is greater than a second reference value in order to determine whether the fingerprint mark exists on the electronic device. In operation 1301, even if the presence of the fingerprint mark on the electronic device 401 is not identified, there is a risk that the fingerprint mark remains, so that operation 1303 may be required as additional procedure. If the number of user's touch inputs on the electronic device 401 for operating the electronic device 401 is greater than a designated number, it may be practically impossible to steal the fingerprint mark because of smudging or blurring. For identifying the number of touch inputs, the fingerprint sensor 601 included in the input unit 430 of FIG. 4 may be utilized. Alternatively, for identifying the number of touch inputs, at least another sensor for detecting the touch input on the electronic device 401 may be utilized.

Although operation 1303 in FIG. 13 shows an example in which the number of touch inputs is compared with the second reference value, it is possible to utilize another metric for determining whether the fingerprint mark exists on the electronic device. For example, the fingerprint mark removing unit 422 may compare a value indicating an intensity of the touch input with a third reference value. The intensity of the touch input may be detected by a pressure sensor. In another embodiment, the comparing the number of touch inputs with the second reference value and the comparing the intensity of the touch input with the third reference value may be performed simultaneously or sequentially in order to determining whether the fingerprint mark exists on the electronic device.

In operation 1303, when it is determined that the fingerprint mark does not exist on the electronic device (like the case that the number of touch inputs is greater than the second reference value), the fingerprint mark removing unit 422 may determine that the fingerprint mark is not nearly left on the electronic device 401. Then, the fingerprint mark removing unit 422 may determine that the fingerprint mark does not exist on the electronic device by proceeding to operation 1305.

In operation 1301, when the fingerprint matching score is greater than the first reference value, the fingerprint mark removing unit 422 may determine that the fingerprint mark is left on the electronic device 401, and display an interface for removing the fingerprint mark by proceeding to operation 1307. Also, in operation 1303, if the fingerprint mark removing unit 422 determines that the fingerprint mark exists on the electronic device (e.g., that the number of touch inputs is less than or equal to the second reference value), the fingerprint mark removing unit 422 may display a user interface for removing the fingerprint mark by proceeding to operation 1307.

Although operations 1301 and 1303 are depicted as being performed sequentially to determine whether the fingerprint mark is left on the electronic device 401 in FIG. 13, the order of operations 1301 and 1303 may be changed or the operations 1301 and 1303 may be performed independently or concurrently according to an embodiment of the present disclosure.

FIG. 14 illustrates an operation for determining whether a fingerprint mark exists in an electronic device according to an embodiment of the present disclosure.

The operation to be described by FIG. 14 may be an operation of the electronic device utilizing a touch sensor for determining whether the fingerprint mark exists. The fingerprint mark removing unit 422 of the control unit 420 may determine whether to display the user interface for removing the fingerprint mark based on a touch input through the touch sensor.

Referring to FIG. 14, in operation 1401, the fingerprint mark removing unit 422 may detect the movement of the touch input. For example, the fingerprint mark removing unit 422 may trace, in an operation process of the electronic device 401 such as fingerprint registration or recognition, the occurrence of a touch input (e.g., a touch by a finger) on the electronic device 401 and the movement of the touch input.

In operation 1403, the fingerprint mark removing unit 422 may determine whether the touch input is released. For example, the fingerprint mark removing unit 422 may determine that the touch input is released when the touch input through the touch sensor is no longer detected.

In operation 1403, when the fingerprint mark removing unit 422 determines that the touch input is released, the fingerprint mark removing unit 422 may determine whether the moving distance of the touch input is greater than a reference distance by proceeding to operation 1405. The moving distance of the touch input may be determined based on information on the movement of the touch input acquired through the touch sensor. The reference distance is used as a criterion for removing the fingerprint mark. The reference distance may be predetermined and stored in the storage unit 440 of FIG. 4. The fingerprint mark removing unit 422 may compare the moving distance of the touch input with the reference distance to determine whether the fingerprint mark is removed by the movement of the touch input. In another embodiment, the fingerprint mark removing unit 422 may compare the speed of the touch input with a reference speed to determine whether the fingerprint mark is removed by the movement of the touch input.

The fingerprint mark removing unit 422 may determine whether to display the user interface for removing the fingerprint mark based on a result of the comparison of the moving distance of the touch input with the reference distance or the comparison of the speed of the touch input with the reference speed. In other words, in operation 1405, when the moving distance of the touch input (or the speed of the touch input) is greater than the reference distance (or the reference speed), the fingerprint mark removing unit 422 may detect the touch input on the electronic device, without displaying the interface for removing the fingerprint mark, by proceeding to operation 1401. Although FIG. 14 illustrates the embodiment that proceeds to operation 1401 when the moving distance (or the speed) of the touch input is greater than the reference distance (or the reference speed), in another embodiment, the fingerprint mark removing unit 422 may determine that no additional operation is required and may terminate the operation of FIG. 14.

In operation 1405, when the moving distance (or the speed) of the touch input is less than or equal to the reference distance (or the reference speed), the fingerprint mark removing unit 422 may displays the user interface for removing the fingerprint mark through the display unit 410 of FIG. 4 by proceeding to operation 1407.

The fingerprint mark removing unit 422 may determine a position to display the user interface for removing the fingerprint mark based on the touch input received through the touch sensor. For example, when registering or recognizing a fingerprint, the fingerprint mark removing unit 422 may determine a position at which the touch input occurs by using the touch sensor, and determine the position as a position to display the user interface for removing the fingerprint mark.

The fingerprint mark removing unit 422 may determine display characteristics of the user interface for removing the fingerprint mark based on the touch input received through the touch sensor. For example, when registering or recognizing a fingerprint, the fingerprint mark removing unit 422 may determine the width or height of the touch input and may display the user interface for removing the fingerprint mark in size corresponding to the width or height of the touch input.

In operation 1407, when the user interface for removing the fingerprint mark is displayed, the fingerprint mark removing unit 422 may determine whether an appropriate (or suitable) touch input on the user interface is detected. For example, the fingerprint mark removing unit 422 may determine whether a touch input through the touch sensor is an appropriate touch input on the user interface for removing the fingerprint mark. The fingerprint mark removing unit 422 may determine whether to display the user interface again, based on whether the touch input is detected at appropriate location for removing the fingerprint mark.

In operation 1409, when the appropriate touch corresponding to the interface for removing the fingerprint mark is not detected through the touch sensor, the fingerprint mark removing unit 422 may control the display unit 410 to display the user interface for removing the fingerprint mark by returning to operation 1407.

In operation 1409, when the appropriate touch corresponding to the user interface for removing the fingerprint mark is detected through the touch sensor, the fingerprint mark removing unit 422 may determine that no fingerprint mark remains on the electronic device 401 by proceeding to operation 1411.

In another embodiment, when the position at which the touch input is received is different from the position at which the user interface is displayed, the fingerprint mark removing unit 422 may determine an offset value based on a difference between the position at which the user interface is displayed and the position at which the touch input is actually received. Based on the offset value, the fingerprint mark removing unit 422 may correct the position to display the user interface and may control the display unit 410 to display the user interface at the corrected position.

FIG. 15 illustrates an operation for determining whether a fingerprint mark exists in an electronic device according to an embodiment of the present disclosure.

The operation to be described by FIG. 15 may be an operation of the electronic device utilizing a pressure sensor for determining whether the fingerprint mark exists. The fingerprint mark removing unit 422 of the control unit 420 may determine whether to display the user interface for removing the fingerprint mark based on information on the pressure of the touch input detected by the pressure sensor.

Referring to FIG. 15, in operation 1501, the pressure sensor may detect a pressure of the touch input. The pressure sensor may generate a signal indicating a value corresponding to the pressure of the touch input, and provide the generated signal to the control unit 420.

In operation 1503, the fingerprint mark removing unit 422 may determine whether the value corresponding to the pressure of the touch input is within a reference range. The fingerprint mark removing unit 422 may identify the value corresponding to the pressure of the touch input based on a signal provided from the touch sensor. The reference range may be predetermined and stored in the storage unit 440 to be used for determining whether the fingerprint mark is present on the electronic device 401. For example, if the pressure is too weak or too high, the fingerprint mark is not maintained in a distinct form. Therefore, if the intensity of the pressure is smaller than the minimum value of the reference range or larger than the maximum value of the reference range, the fingerprint mark removing unit 422 may determine not to display the user interface for removing the fingerprint mark.

In operation 1503, when the value corresponding to the pressure of the touch input is within the reference range, the fingerprint mark removing unit 422 may display the interface for removing the fingerprint mark by proceeding to operation 1505.

In operation 1503, when the value corresponding to the pressure of the touch input is out of the reference range, the fingerprint mark removing unit 422 may determine that that no fingerprint mark remains on the electronic device 401 by proceeding to operation 1507.

Figure 16:
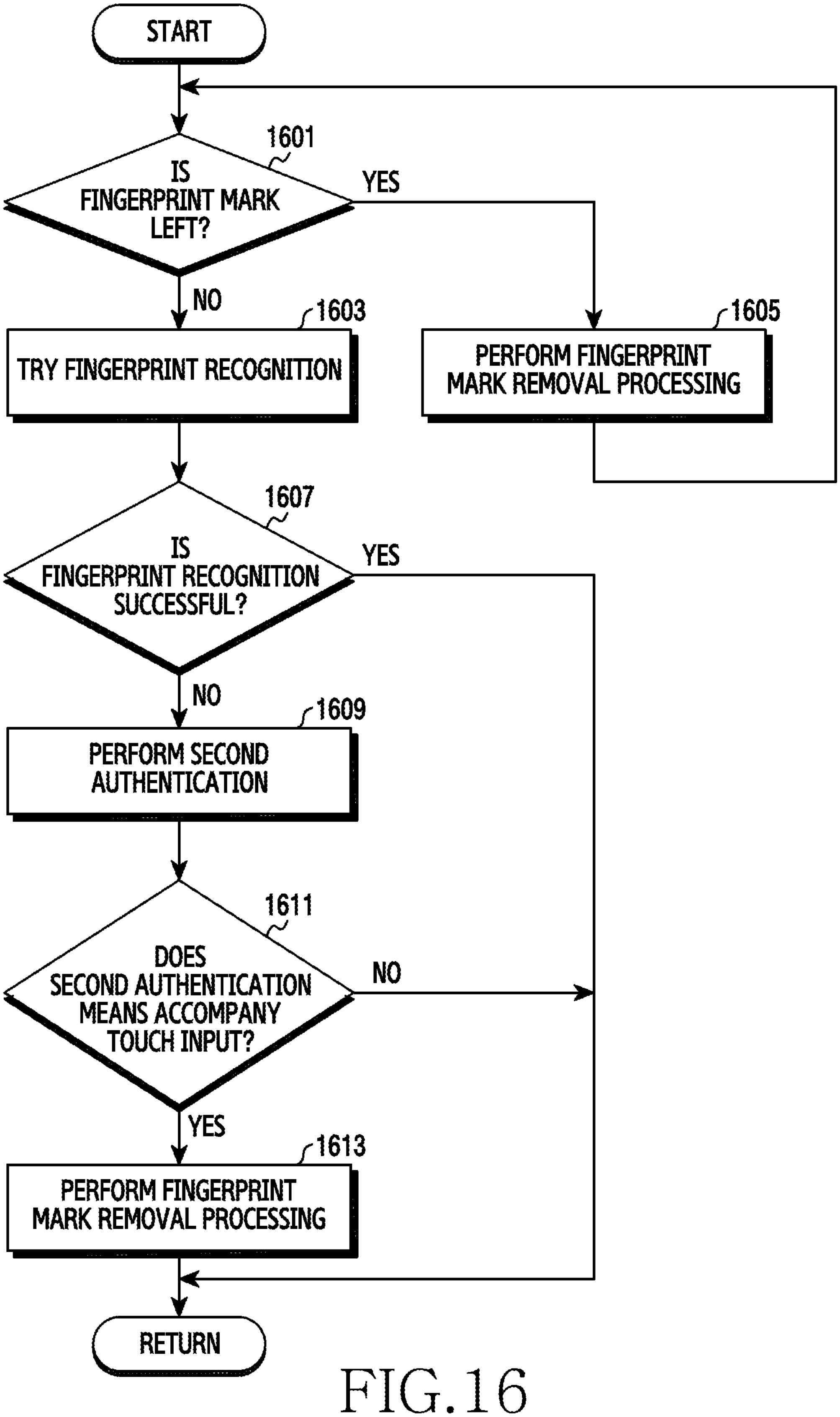
FIG. 16 illustrates an operation for removing a fingerprint mark generated from authentication means other than fingerprint recognition in an electronic device according to an embodiment of the present disclosure.

FIG. 16 illustrates an example of an operation for removing a fingerprint mark generated from authentication means other than fingerprint recognition in the electronic device according to an embodiment of the present disclosure.

Although FIG. 16 illustrates an example of fingerprint recognition for releasing the lock mode of the electronic device 401, the operations shown in FIG. 16 can be performed in the case performing not only fingerprint recognition for releasing the lock mode but also user authentication (e.g., when running a financial service application).

Referring to FIG. 16, in operation 1601, the fingerprint recognition processing unit 421 may determine whether the fingerprint mark is left on the electronic device 401. For example, before performing the authentication for switching (or changing) the operation mode of the electronic device 401 from the lock mode to the unlock mode by using the fingerprint sensor 601, the fingerprint recognition processing unit 421 determines whether the fingerprint mark is left on the electronic device 401. The lock mode refers to an operation mode in which only some of the functions of the electronic device 401 are available. The lock mode may be released by a preconfigured authentication means. By determining whether the fingerprint mark is left on the electronic device 401 before the fingerprint recognition, it is possible to prevent a collision between the fingerprint for releasing the lock mode and another fingerprint mark that has been left on the electronic device.

In operation 1601, when the fingerprint mark exists, the control unit 420 may, by proceeding to operation 1605, control the display unit 410 to display the user interface for removing the fingerprint mark before the fingerprint recognition is performed. Operations for removing the fingerprint can be performed as the examples in FIGS. 13 to 15.

In operation 1601, when the fingerprint mark does not exist, the fingerprint recognition processing unit 421 proceeds to operation 1603 and tries fingerprint recognition. For example, the fingerprint recognition processing unit 421 may control the display unit 410 to display an interface for releasing the lock mode of the electronic device 401.

Then, the fingerprint recognition processing unit 421 may determine whether the fingerprint recognition is successful, by proceeding to operation 1607. For example, when a fingerprint detected from the touch input corresponds to the fingerprint information stored in the storage unit 440 in operation 1603, the fingerprint recognition processing unit 421 may determine that the fingerprint recognition is successful.

In operation 1607, when the fingerprint recognition is successful, the fingerprint recognition processing unit 421 may detect additional touch input. This means that a touch input in general operation of the electronic device 401 in the unlock mode may be detected and that the procedure for removing fingerprint mark shown in FIG. 7 can be additionally performed.

In operation 1607, when the fingerprint recognition fails, the control unit 420 may perform a second authentication by proceeding to operation 1609. The second authentication refers to the secondary authentication means for the case where the fingerprint recognition as the first authentication means has failed. For example, the second authentication means may include one or more of a password, iris recognition, pattern lock, voice, e-mail, or query response, other than the fingerprint recognition. The information on the second authentication means may be preconfigured and stored in the storage unit 440 to release the lock mode of the electronic device 401.

Then, the control unit 420 may determine whether the second authentication means accompanies a touch input by a user, by proceeding to operation 1611. For example, the control unit 420 may determine whether the password or the pattern lock is used as the second authentication means. If so, the control unit 420 may determine a region where the touch input is received and determine to display the user interface for removing the fingerprint mark according to the presence of the fingerprint mark. Thus, the electronic device can prevent a fingerprint stealing in the case that the fingerprint mark has remained on the electronic device 401 even if the user did not intend to input the fingerprint.

In operation 1611, when the second authentication means accompanies a touch input, the fingerprint mark removing unit 422 may perform the operation for removing a fingerprint mark generated from a touch input accompanied by the second authentication means, by proceeding to operation 1613. Operations for removing the fingerprint mark may be performed as operations described by FIGS. 13 to 15.

In operation 1611, when the second authentication means does not accompany a touch input, the control unit 420 may perform an additional operation such as detecting an additional touch input.

Figure 21:
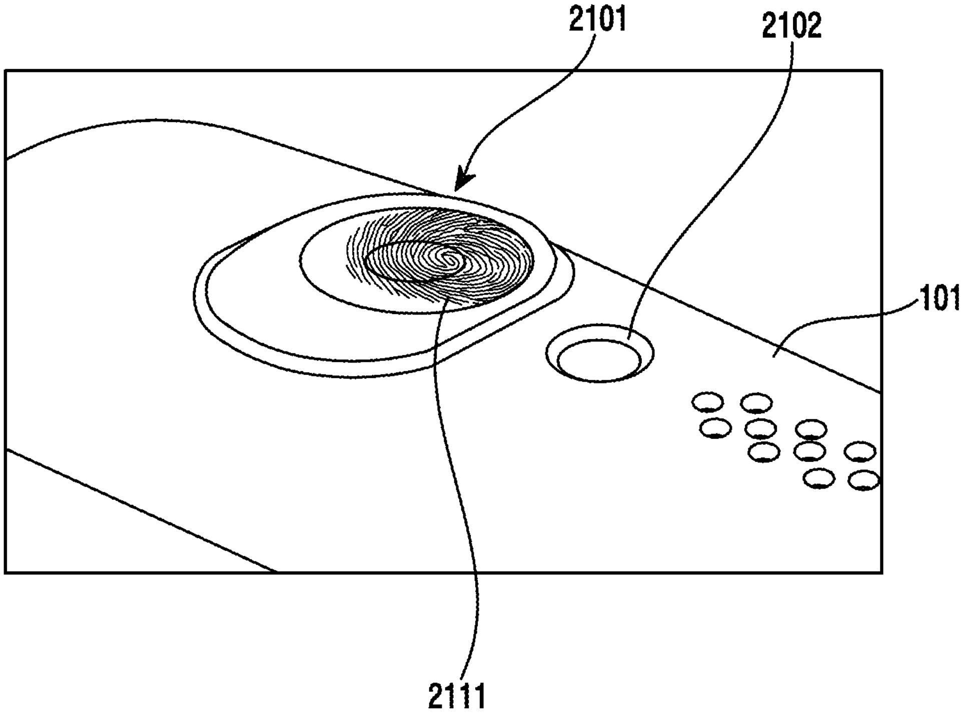
FIG. 21 illustrates a fingerprint mark located on a camera of an electronic device according to various embodiments of the present disclosure.

FIG. 21 illustrates a fingerprint mark located on a camera of an electronic device according to various embodiments of the present disclosure.

Referring to FIG. 21, an example of fingerprint mark located on a camera 2101 of the electronic device 401 is illustrated. The embodiment of FIG. 21 shows a case of identifying the fingerprint mark 2111 through an image sensor located in the camera 2101. The control unit 420 may identify the fingerprint mark which is left on a lens of the camera 2101, based on data received through the image sensor of the camera and control the display unit 410 to display the user interface that guides removing the fingerprint mark. In some embodiments, the electronic device 401 may further include a supplementary camera 2102 other than the camera 2101. In case of including the supplementary camera 2102, the above embodiments of the present disclosure can be applied.

By removing the fingerprint mark on the camera 2101, the electronic device can prevent not only the fingerprint being stolen but also degraded quality of the image through the camera on which the fingerprint mark is present.

Although the embodiments described above illustrate a process for preventing the fingerprint mark on the electronic device 401 from being stolen, embodiments of the present disclosure may be used not only to prevent the fingerprint from being stolen but also to recognize foreign substances adhered to the surface of the electronic device 401.

While a concrete example embodiment has been explained in the detailed description of the present disclosure, it is undoubted that various modifications are available without departing from the scope of the present disclosure. Therefore, the scope of the present disclosure should not be defined by a limitation to the explained example embodiment and should be defined by not only the scope of claims mentioned below but also equivalents to the scope of these claims.

And, example embodiments disclosed in the specification and drawings only suggest specific examples so as to easily explain the content of the present disclosure and help the understanding thereof, and are not to limit the scope of the present disclosure. Accordingly, the scope of the present disclosure should be construed as including all modified or changed forms that are drawn on the basis of the technological spirit of the present disclosure, in addition to the example embodiments disclosed herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
at least one sensor disposed under a region of the display; and
at least one processor configured to:
detect, using the at least one sensor, a touch input on the region of the display,
identify at least one of a position at which the touch input is detected or a size of the detected touch input, and
display, using the display, a user interface which guides to remove a mark caused by the touch input,
wherein the mark includes biometric information acquired based on the touch input, and
wherein the user interface is displayed, on the display, based on at least one of the identified position or the identified size.

2. The electronic device of claim 1,
wherein the at least one processor is further configured to determine whether the mark is capable of being stolen from the electronic device based on touch input information, and
wherein the biometric information includes fingerprint information.

3. The electronic device of claim 2, wherein the touch input information includes at least one of movement information of the touch input or pressure information associated with a pressure of the touch input.

4. The electronic device of claim 3, wherein the at least one processor is further configured to, in response to determining that the pressure of the touch input is within a reference range, display the user interface.

5. The electronic device of claim 1,
wherein the at least one processor is further configured to determine whether the mark is capable of being stolen from the electronic device based on a use of the electronic device, and
wherein the use of the electronic device comprises a public device or a personal device.

6. The electronic device of claim 5, wherein the use of the electronic device is determined based on at least one of a type of the electronic device, an access log of the electronic device, or a location of the electronic device.

7. The electronic device of claim 1, wherein the at least one processor is further configured to:
identify a shape of the mark located where the touch input is received,
determine that a value indicating degree of matching between the shape of the mark and another biometric information stored in the electronic device is greater than a first reference value, and
in response to determining that the value is greater than the first reference value, display the user interface.

8. The electronic device of claim 1, wherein the at least one processor is further configured to:
display, through the display, a screen corresponding to a lock mode, and
in response to determining that the mark is present on a surface of the display, display the user interface.

9. The electronic device of claim 1,
wherein the user interface comprises a user interface for receiving a gesture on area where the mark is present on the display, and
wherein the area is associated with the region of the display.

10. The electronic device of claim 9, wherein the user interface comprises at least one of a graphic user interface (GUI) including object changing according to the gesture, a user interface including a slide toggle performing a function according to the gesture, or a message indicating to remove the mark.

11. A method of an electronic device comprising:
detecting, using at least one sensor disposed under a region of a display of the electronic device, a touch input on the region of the display;

identifying at least one of a position at which the touch input is detected or a size of the detected touch input; and displaying, using the display, a user interface which guides to remove a mark caused by the touch input, wherein the mark includes biometric information acquired based on the touch input, and wherein the user interface is displayed, on the display, based on at least one of the identified position or the identified size.

12. The method of claim 11, further comprising:

determining whether the mark is capable of being stolen from the electronic device based on touch input information, wherein the biometric information includes fingerprint information.

13. The method of claim 12, wherein the touch input information includes at least one of movement information of the touch input or pressure information associated with a pressure of the touch input.

14. The method of claim 13, wherein the displaying the user interface comprises, in response to determining that the pressure of the touch input is within a reference range, displaying the user interface.

15. The method of claim 11, further comprising:

determining whether the mark is capable of being stolen from the electronic device based on a use of the electronic device, and wherein the use of the electronic device comprises a public device or a personal device.

16. The method of claim 15, wherein the use of the electronic device is determined based on at least one of a type of the electronic device, an access log of the electronic device, or a location of the electronic device.

17. The method of claim 11, wherein the displaying of the user interface comprises:

identifying a shape of the mark located where the touch input is received;

determining that a value indicating degree of matching between the shape of the mark and another biometric information stored in the electronic device is greater than a first reference value; and in response to determining the value is greater than the first reference value, displaying the user interface.

18. The method of claim 11, further comprising:

displaying, through the display, a screen corresponding to a lock mode; and in response to determining that the mark is present on a surface of the display, displaying the user interface.

19. The method of claim 11, wherein the user interface comprises a user interface for receiving a gesture on area where the mark is present on the display, and wherein the area is associated with the region of the display.

20. The method of claim 19, wherein the user interface which guides to remove the mark comprises at least one of a graphic user interface (GUI) including object changing according to the gesture, a user interface including a slide toggle performing a function according to the gesture, or a message indicating to remove the mark.

* * * * *